(12) United States Patent
Qu et al.

(10) Patent No.: US 10,999,108 B2
(45) Date of Patent: May 4, 2021

(54) WIRELESS COMMUNICATION METHOD, APPARATUS, AND SYSTEM

(71) Applicant: HUAWEI TECHNOLOGIES CO., LTD., Guangdon (CN)

(72) Inventors: Bingyu Qu, Beijing (CN); Hao Sun, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 42 days.

(21) Appl. No.: 16/571,969

(22) Filed: Sep. 16, 2019

(65) Prior Publication Data

US 2020/0044897 A1 Feb. 6, 2020

Related U.S. Application Data

(63) Continuation of application No. PCT/CN2018/079117, filed on Mar. 15, 2018.

(30) Foreign Application Priority Data

Mar. 17, 2017 (CN) .......................... 201710162089.5

(51) Int. Cl.
*H04L 25/03* (2006.01)
*H04L 27/26* (2006.01)
(Continued)

(52) U.S. Cl.
CPC ...... *H04L 25/03159* (2013.01); *H04L 5/0053* (2013.01); *H04L 25/03* (2013.01);
(Continued)

(58) Field of Classification Search
None
See application file for complete search history.

(56) References Cited

U.S. PATENT DOCUMENTS

2008/0165882 A1* 7/2008 Hedayat ................ H04L 1/0625
375/267
2008/0232432 A1* 9/2008 Lee ..................... H04L 27/2607
375/140
(Continued)

FOREIGN PATENT DOCUMENTS

CN  101521651 A  9/2009
CN  102007745 A  4/2011
(Continued)

OTHER PUBLICATIONS

Iith et al: "Pre-DFT Multiplexing of RS and Data: Results on Short Duration One OFDM Symbol Upiink",3GPP Draft; R1-1701913,total 8 pages.
(Continued)

*Primary Examiner* — Bunjob Jaroenchonwanit
(74) *Attorney, Agent, or Firm* — Womble Bond Dickinson (US) LLP

(57) ABSTRACT

This application relates to the mobile communications field, and in particular, to a data sending method in a wireless communications system. A first device generates a signal before DFT transform is performed including $2 \times M$ signal elements. The $2 \times M$ signal elements include elements in two element groups A and B, the elements in the two element groups respectively meet same-number repetition and inverse-number repetition characteristics, and the $2 \times M$ signal elements further include another element group C that does not need to meet the same-number repetition/inverse-number repetition characteristics. The element in the element group A and an element in the element group C are multiplexed before DFT, and there is an interval, so that the element group A is not interfered by the element group B or the element group C.

20 Claims, 12 Drawing Sheets

(51) Int. Cl.
*H04W 72/08* (2009.01)
*H04W 72/04* (2009.01)
*H04L 5/00* (2006.01)

(52) U.S. Cl.
CPC .... *H04L 25/03343* (2013.01); *H04L 27/2636* (2013.01); *H04W 72/0453* (2013.01); *H04W 72/082* (2013.01)

(56) References Cited

U.S. PATENT DOCUMENTS

| | | | |
|---|---|---|---|
| 2008/0267122 A1* | 10/2008 | Han | H04L 25/0226 370/329 |
| 2009/0003274 A1* | 1/2009 | Kwak | H04L 5/0091 370/329 |
| 2010/0008432 A1 | 1/2010 | Kim et al. | |
| 2010/0182972 A1* | 7/2010 | Katayama | H04W 72/048 370/329 |
| 2011/0013585 A1* | 1/2011 | Jitsukawa | H04L 5/0048 370/330 |
| 2011/0129029 A1 | 6/2011 | Liu et al. | |
| 2012/0155412 A1* | 6/2012 | Kawamura | H04J 11/003 370/329 |
| 2013/0016712 A1* | 1/2013 | Tomeba | H04L 25/0204 370/345 |
| 2013/0017836 A1* | 1/2013 | Chang | H04B 7/086 455/452.1 |
| 2013/0070703 A1* | 3/2013 | Yasukawa | H04W 72/0406 370/329 |
| 2014/0161067 A1 | 6/2014 | Lee et al. | |
| 2014/0226736 A1* | 8/2014 | Niu | H04L 27/2628 375/260 |
| 2015/0358974 A1 | 12/2015 | Jung et al. | |
| 2016/0269207 A1* | 9/2016 | Gaal | H04L 27/122 |
| 2017/0013582 A1* | 1/2017 | Takekawa | H04W 56/0045 |
| 2017/0070377 A1 | 3/2017 | Sawahashi et al. | |
| 2017/0223732 A1* | 8/2017 | Bertrand | H04W 52/04 |
| 2017/0230138 A1* | 8/2017 | Xiong | H04W 72/0473 |
| 2018/0191423 A1 | 7/2018 | Qu et al. | |
| 2019/0029026 A1* | 1/2019 | Yun | H04L 27/2602 |

FOREIGN PATENT DOCUMENTS

| | | |
|---|---|---|
| CN | 102474376 A | 5/2012 |
| CN | 104052494 A | 9/2014 |
| CN | 106027204 A | 10/2016 |
| WO | 2016145196 A1 | 9/2016 |
| WO | 2017028042 A1 | 2/2017 |
| WO | 2017035808 A1 | 3/2017 |

OTHER PUBLICATIONS

Ye Wu et al: "Two-Dimension Adaptive Spectral Efficiency for SC-FDMA Systems",Sep. 6, 2010,total 6 pages.
Huawei et al: "Short duration PUCCH for small to medium payload sizes",3GPP Draft; R1-1701646,Feb. 6, 2017,total 6 pages.
Qualcomm Incorporated: "Channelization of short PUCCH",3GPP Draft; R1-1702631, Feb. 12, 2017,total 8 pages.

* cited by examiner

WIRELESS COMMUNICATION METHOD, APPARATUS, AND SYSTEM

CROSS-REFERENCE TO RELATED APPLICATIONS

This application is a continuation of International Application No. PCT/CN2018/079117, filed on Mar. 15, 2018, which claims priority to Chinese Patent Application No. 201710162089.5, filed on Mar. 17, 2017. The disclosures of the aforementioned applications are hereby incorporated by reference in their entireties.

TECHNICAL FIELD

This application relates to the field of wireless communications technologies, and in particular, to a wireless communication method, apparatus, and system.

BACKGROUND

In a long term evolution (LTE) system, an uplink signal is transmitted on some uplink channels by using discrete Fourier transform (DFT) spread orthogonal frequency division multiplexing (OFDM) (DFT-s-OFDM). A DFT-s-OFDM data sending mode is shown in FIG. 1. Transmitting a signal in a DFT-s-OFDM manner can maintain a relatively low peak to average power ratio, so as to improve uplink coverage in a case of limited uplink power. In FIG. 1, after a cyclic prefix is added to a time domain signal, the time domain signal is sent by a transmitter. Similarly, data information may also be directly mapped to a frequency domain subcarrier without being processed through DFT transform, and after a mapped frequency domain signal is transformed into a time domain signal through inverse Fourier transform, the time domain signal is supplemented with a cyclic prefix and is sent by the transmitter. For any system, one DFT-s-OFDM/OFDM symbol is a basic time unit corresponding to a subcarrier spacing used in the system, and for a system with a subcarrier spacing of 15 kHz, one DFT-s-OFDM/OFDM symbol has a time length of $1/15000$ second.

In the LTE system, a reference signal (RS) and data of a physical uplink control channel (PUCCH) are sent on different DFT-s-OFDM/OFDM symbols. However, in a current 5G system, there is a requirement for sending a PUCCH on one DFT-s-OFDM symbol, and coherent demodulation needs to be implemented, to be specific, a reference signal is used to obtain a channel state matrix, a data part is processed in frequency domain based on the channel state matrix, and then data information is demodulated. This requires that uplink control information (UCI) and the RS are both carried on one DFT-s-OFDM symbol. The UCI is data carried on the PUCCH. In addition, because the PUCCH is sent by using a single OFDM symbol, energy for sending the control channel is severely limited. To improve a coverage capability of the PUCCH on the single OFDM symbol, in FIG. 2, a pre-DFT (Pre-DFT) (data and a reference signal are multiplexed in a TDM manner before DFT transform) data sending mode is proposed. To be specific, the RS and the UCI are multiplexed in time domain in a TDM manner, and are mapped to subcarriers after DFT transform is performed on the RS and the UCI, as shown in FIG. 2. Before DFT, the RS and the UCI are multiplexed in a TDM manner, so that aliasing of signals in time domain can be avoided, and a relatively high peak to average power ratio (PAPR) can be avoided. However, because of a multipath effect, a delay may occur when a same signal arrives at a receive end through a plurality of paths, which may cause superposition of an RS and UCI on a receive end even if a low PAPR of the signal can be ensured on a transmit end. Consequently, performance of the receive end in demodulating UCI information is affected. FIG. 3 is a schematic diagram of received-signal superposition caused by a multipath effect.

In a 3GPP RAN1 conference, a method for avoiding aliasing of a plurality of received data blocks is proposed. As shown in FIG. 4, one data block is an RS, and the other two data blocks are UCI. When the transmit end generates a signal, a guard interval is added before and after the RS. A time length of the guard interval is greater than or equal to a maximum delay spread supported by a system. In the guard interval, RS-related information used to combat the maximum delay spread needs to be filled. In this way, even if there is a delay among signals that arrive on the receiving side through a plurality of paths due to a multipath effect, the guard interval between the RS and the UCI avoids aliasing. However, the guard interval cannot be used to transmit the UCI. In conclusion, although the foregoing method avoids mutual interference among a plurality of data blocks by using the guard interval, the guard interval causes a decrease in system resource utilization.

SUMMARY

This application describes a wireless communication method, apparatus, and system.

According to a first aspect, an embodiment of this application provides a wireless communication method, where the method includes:

generating a signal sequence $\{B(t)\}$ that includes $2 \times M$ elements, where M and t are integers, $0 \leq t \leq 2 \times M - 1$, $B(t)$ is an element in the signal sequence $\{B(t)\}$. In an example, $B(t)$ meets $B(t)=S(t)+Y(t)$, $S(t)$ is an element in a signal sequence $\{S(t)\}$, and $Y(t)$ is an element in a signal sequence $\{Y(t)\}$. The signal sequence $\{B(t)\}$ may be understood as superposition (or multiplexing) of the signal sequence $\{S(t)\}$ and another signal sequence. It may be understood that the signal sequence $\{B(t)\}$ may alternatively be superposition (or multiplexing) of the signal sequence $\{S(t)\}$ and one or more sequences, that is, the signal sequence $\{Y(t)\}$ may be considered as superposition (or multiplexing) of a plurality of sequences. In another example, the signal sequence $\{B(t)\}$ is the signal sequence $\{S(t)\}$, that is, $B(t)=S(t)$. It may be understood that in this case, $B(t)=S(t)+Y(t)$, where $Y(t)$ is 0. An expression manner is not limited in this application.

The signal sequence $\{S(t)\}$ includes a first element group and a second element group, the first element group includes $2 \times M_1 + 2 \times M_2$ elements, and the second element group includes $2 \times M_3$ elements, where $M_1+M_2+M_3 < M$, $M_1$ and $M_2$ are integers greater than or equal to 0, $M_3$ is an integer greater than 0, and $M_1+M_2$ is greater than or equal to 0.

The first element group includes a third element group that has $M_1+M_2$ elements and a fourth element group that has $M_1+M_2$ elements, where an element in the third element group is $S(t \bmod (2M))$ that meets the following condition: t meets $d_1 \leq t \leq d_1+M_1-1$ or $d_1+M_1+M_3 \leq t \leq d_1+M_1+M_3+M_2-1$, where $d_1$ is an integer greater than or equal to 0, and mod represents a modulo operation; and an element in the fourth element group is $S((t+M) \bmod (2M))$ that meets the following conditions: t meets $d_1 \leq t \leq d_1+M_1-1$ or $d_1+M_1+M_3 \leq t \leq d_1+M_1+M_3+M_2-1$, and $S(t \bmod (2M))=a \times S((t+M) \bmod (2M))$, where $a=1$ or $-1$.

It may be understood that if t in the element $S(t)$ in the third element group is less than $2M$, $S(t)=S(t \bmod (2M))$.

There is no need to perform a modulo operation. If t+M in the element S(t+M) in the third element group is less than 2M, S(t+M)=S((t+M)mod(2M)), no modulo operation needs to be performed. In this application, 2M is 2×M. Similarly, the foregoing description is also applicable to elements in a fourth element group, a fifth element group, a sixth element group, and a seventh element group.

At least one element in the second element group is a non-zero element, and the second element group includes a fifth element group that has $M_3$ elements and a sixth element group that has $M_3$ elements, where an element in the fifth element group is S(tmod(2M)) that meets the following condition: t meets $d_1+M_1 \le t \le d_1+M_1+M_3-1$; and an element in the sixth element group is S((t+M)mod(2M)) that meets the following conditions: t meets $d_1+M_1 \le t \le d_1+M_1+M_3-1$, and $S(t \bmod(2M))=-a \times S((t+M) \bmod(2M))$.

The signal sequence {S(t)} further includes a seventh element group, at least one element in the seventh element group is a non-zero element, and an element in the seventh element group is S(tmod(2M)) that meets the following condition: t meets $0 \le t \le d_1-1$ or $d_1+M_1+M_3+M_2 \le t \le d_1+M-1$ or $d_1+M_1+M_3+M_2+M \le t \le 2 \times M-1$.

In an example, at least one element in the first element group is a non-zero element. That is, at least one of the $2 \times M_1+2 \times M_2$ elements in the first element group is a zero element.

In another example, it is not limited whether an element in the first element group is a non-zero element, and at least one element in the signal sequence {Y(t)} is a non-zero element. When at least one element in {Y(t)} is a non-zero element, the element Y(t) in {Y(t)} meets $Y(t)=a \times Y((t+M) \bmod(2M))$.

In an example, the seventh element group carries $2 \times (M-M_1-M_2-M_3)$ information elements. In another example, at least one element in the seventh element group does not meet $S(t \bmod(2M))=a \times S((t+M) \bmod(2M))$.

In an example, the method further includes: performing discrete Fourier transform DFT on the signal sequence {B(t)}, and mapping a signal sequence processed through DFT to a frequency domain subcarrier to generate a signal mapped to the frequency domain subcarrier.

In one embodiment, the method further includes: performing inverse fast Fourier transform (IFFT) on the signal on the frequency domain subcarrier, to generate a signal processed through IFFT.

In one embodiment, the method further includes: sending the signal processed through IFFT.

In another example, the method further includes performing pulse shaping filtering on the signal sequence {B(t)} to generate a signal processed through pulse shaping filtering.

In one embodiment, the method further includes: sending the signal processed through pulse shaping filtering.

In the method, interference, between the first element group and the second element group, caused by a multipath effect on a receiving side is avoided. In addition, system resource utilization is improved.

According to a second aspect, this application further provides a wireless communication method, where the method includes: generating a signal sequence {B(t)} that includes 2×M elements, B(t) is an element in {B(t)}, and B(t) meets B(t)=S(t)+Y(t), t represents an element index of the sequence, M and t are integers, and $0 \le t \le 2 \times M-1$; and the signal sequence S(t) meets:

when $d_1 \le t \le d_1+M_1-1$ or $d_1+M_1+M_3 \le t \le d_1+M_1+M_3+M_2-1$, $S(t)=a \times S(t+M)$;

when $d_1+M_1 \le t \le d_1+M_1+M_3-1$, $S(t)=-a \times S(t+M)$; and when $0 \le t \le d_1-1$ or $d_1+M_1+M_3+M_2 \le t \le d_1+M-1$ or $d_1+M_1+M_3+M_2+M \le t \le 2 \times M-1$, S(t) carries $2 \times (M-M_1-M_2-M_3)$ information elements, or at least one element S(t) does not meet $S(t)=a \times S(t+M)$, where $M_1$, $M_2$, $M_3$, and $d_1$ integers, $M_1 \square 0$, $M_2 \square 0$, $M_3 > 0$, $M > 2$, $d_1 \square 0$ and a=1 or a=−1; and generating a signal of a frequency domain subcarrier based on the signal sequence {B(t)}, or performing pulse shaping filtering on the signal sequence B(t) to generate a signal processed through pulse shaping filtering.

In an example, $M_1+M_2>0$. In another example, $M_1>0$ and $M_2>0$.

In an example, when $d_1 \le t \le d_1+M_1-1$ or $d_1+M_1+M_3 \le t \le d_1+M_1+M_3+M_2-1$, S(t) carries $M_1+M_2$ information elements, and the $M_1+M_2$ information elements are at least one piece of the following information: data, control information, and data and control information. The second element group carries $M_3$ information elements, and the $M_3$ information elements are one piece of the following information: a reference signal, data, control information, and data and control information.

In an example, when $0 \le t \le 2 \times M-1$, Y(t)=0, and B(t)=S(t), that is, the signal sequence {B(t)} is the signal sequence {S(t)}.

In another example, when t meets the following condition, Y(t)=0:

$0 \le t \le d_1+M_1-1$ or $d_1+M_1+M_3 \le t \le d_1+M_1+M-1$ or $d_1+M_1+M_3+M \le t \le 2 \times M-1$; and when t meets the following condition, at least one Y(t) is not equal to 0: $d_1+M_1 \le t \le d_1+M_1+M_3-1$; and for t existing when Y(t) is not equal to 0, $Y((t+M))=a \times Y(t)$, and t meets the following:

$S(t)=A_1 \times c(t)$, and $Y(t)=A_2 \times j \times c(t)$ or $Y(t)=-j \times A_2 \times c(t)$, where c(t) is a non-zero complex number, $A_1$ is a non-zero real number, $A_2$ is a non-zero real number, and j represents an imaginary part of a complex number.

In one embodiment, IFFT may be performed on the signal of the frequency subcarrier, to generate a signal processed through IFFT; and the signal processed through IFFT is sent.

Preferably, in this application, values of t and t+M in S(t) or S(t+M) and Y(t) and Y(t+M) range from 0 to 2M−1. When the values of t and t+M range from 0 to 2M−1, S(t)=S(t), S(t+M)=S(t+M), Y(t+M)=Y(t+M). If the value of t or t+M is greater than or equal to 2M, S(t)=S(tmod(2M)), S(t+M)=S((t+M)mod(2M)), Y(t+M)=Y((t+M)mod(2M)) or Y(t)=Y(t mod(2M)).

In the methods described in the first aspect and the second aspect, at least one of a value of $M_1$, a value of $M_2$, and a value of $M_3$ is a predefined value. For example, the value may be agreed in a communications protocol, or agreed by a transmit end device or a receive end device in a specific manner.

In another example, the method further includes: receiving signaling sent from a peer communication device. For example, a terminal receives signaling sent from a base station, and obtains at least one of a value of $M_1$, a value of $M_2$, and a value of $M_3$ based on the signaling.

In still another example, the method further includes: sending signaling, where the signaling is used to indicate at least one of a value of $M_1$, a value of $M_2$, and a value of $M_3$.

Obtaining at least one of the value of $M_1$, the value of $M_2$, and the value of $M_3$ by using the signaling may improve system flexibility.

In an example, $M_1$ is greater than 0, and $M_2$ is greater than 0.

According to a third aspect, an embodiment of this application provides a wireless communication method, where the method includes:

obtaining a first signal R(t), where the first signal R(t) is generated based on the signal sequence {B(t)} described in the first aspect or the second aspect; and processing the first signal R(t).

In one embodiment, the method includes receiving a second signal, and performing pulse shaping filtering on the second signal to obtain the first signal R(t).

In an example, fast Fourier transform (FFT) is performed on the first signal R(t) to obtain a third signal $R_F(t)$, where t is an integer, and $0 \leq t \leq 2 \times M-1$.

A fourth signal $R_{F\_rs}(t)$ is generated based on the third signal $R_F(t)$, where t is an integer, $0 \leq t \leq 2 \times M-1$, when t is an odd number, $R_{F\_rs}(t) = R_F(t)$, and when t is an even number, $R_{F\_rs}(t) = 0$; or a fourth signal $R_{F\_rs}(t)$ is generated based on the third signal $R_F(t)$, where t is an integer, $0 \leq t \leq 2 \times M-1$, when t is an even number, $R_{F\_rs}(t) = R_F(t)$, and when t is an odd number, $R_{F\_rs}(t) = 0$.

A fifth signal $R_T(t)$ is obtained by performing IDFT on the fourth signal $R_{F\_rs}(t)$, where t is an integer, and $0 \leq t \leq 2 \times M-1$.

A sixth signal $R_{T\_rs}(t)$ is generated based on the fifth signal $R_T(t)$, where t is an integer, and $0 \leq t \leq 2 \times M-1$.

When $d_1 + M_1 \leq t \leq d_1 + M_1 + M_3 + M_2 - 1$ or $d_1 + M_1 + M \leq t \leq d_1 + M_1 + M_3 + M_2 + M - 1$, $R_{T\_rs}(t) = R_T(t)$; and when $0 \leq t \leq d_1 + M_1 - 1$ or $d_1 + M_1 + M_3 + M_2 \leq t \leq d_1 + M_1 + M - 1$ or $d_1 + M_1 + M_3 + M_2 + M \leq t \leq 2 \times M - 1$, $R_{T\_rs}(t) = 0$.

In an example, a channel is estimated based on the sixth signal $R_{T\_rs}(t)$, where t is an integer, and $0 \leq t \leq 2 \times M-1$. The receive end device detects the signal sequence {B(t)} based on the channel.

In the method, interference, between the first element group and the second element group, caused by a multipath effect on a receiving side is avoided. In addition, system resource utilization is improved.

It may be understood that the method described in any one of the first aspect to the third aspect may be implemented by using a communication apparatus, where the apparatus may be a communication device or may be a chip. The communication device may be a terminal or may be a base station.

According to a fourth aspect, an embodiment of this application provides a communication apparatus, where the apparatus may be a communication device or may be a chip. The communication device may be a terminal or may be a base station. The communication apparatus may implement the methods in the first aspect and the second aspect, and has a corresponding functional unit. The functional unit may be implemented by using hardware, or may be implemented by using software, or may be implemented by using hardware to execute corresponding software. The hardware or the software includes one or more modules corresponding to the functions.

The communication apparatus includes: a processing unit and a storage unit, where the storage unit stores an instruction, and the instruction is used to enable the processing unit to perform the methods described in the first aspect and the second aspect. The processing unit may be implemented by one or more processors. The storage unit may a memory, or may be any other storage module that has a storage function. The storage unit and the processor may be disposed separately or may be integrated together.

In one embodiment, the communication apparatus may further include a transceiver unit, where the transceiver includes a sending unit and a receiving unit. The sending unit is configured to send information to a receiving device when the communication apparatus serves as a sending device. The receiving unit is configured to receive information from a sending device when the communication apparatus serves as a receiving device. For example, the transceiver unit may be implemented by using a transceiver.

For example, the sending unit may be configured to send signaling, where the signaling indicates at least one of a value of $M_1$, a value of $M_2$, and a value of $M_3$. Alternatively, the sending unit is configured to send a signal processed through IFFT.

For another example, the receiving unit may be configured to receive signaling. The processing unit is further configured to obtain at least one of a value of $M_1$, a value of $M_2$, and a value of $M_3$ based on the signaling.

For still another example, the receiving unit is configured to receive a second signal. The processing unit is configured to obtain R(t) after performing pulse shaping filtering on the second signal.

According to a fifth aspect, an embodiment of this application provides a computer storage medium, configured to store a computer software instruction used by the foregoing communication apparatus, where the computer storage medium includes a program for performing the first aspect, the second aspect, or the third aspect.

According to a sixth aspect, an embodiment of this application provides a computer program product, including an instruction. When the computer program is executed by a computer, the instruction enables the computer to perform the method in the first aspect, the second aspect, or the third aspect.

According to a seventh aspect, an embodiment of the present invention provides a system, where the system includes the foregoing communication apparatus.

According to an eighth aspect, this application provides a chip system, where the chip system includes a processor, configured to support the communication apparatus in implementing the function involved in the foregoing aspect, for example, generating or processing data and/or information involved in the foregoing method. In one embodiment, the chip system may further include a memory, where the memory is configured to store a program instruction and data that are necessary for a data sending device. The chip system may include a chip or may include a chip and another discrete device.

In this application, a transmit end generates a signal before DFT transform is performed, where the signal includes 2×M (or may be represented as 2M) signal elements. The 2×M information elements include elements in an element group A and an element group B, and the elements in the two element groups respectively meet same-number repetition and inverse-number repetition characteristics. The signal further includes an element group C that does not need to meet the same-number repetition/inverse-number repetition characteristic. After DFT transform is performed on the 2×M signal elements, the two element groups are orthogonal to each other in frequency domain. The element of the element group A and an element of the element group C are multiplexed before DFT, and there is an interval, so that the element group A is not interfered by the element group B or the element group C.

Compared with the prior art, this application describes the wireless communication method, apparatus, and system. In a system in which a sending manner is DFT-s-OFDM, on a DFT-s-OFDM symbol, interference, between two adjacent element groups, caused by a multipath effect on a receiving side is avoided. In addition, system resource utilization is improved.

DESCRIPTION OF EMBODIMENTS

Solutions provided in this application are applicable to a wireless communications system. Taking a communications system shown in FIG. 4 as an example, a communications system 100 includes at least one network device 20 (for example, including a base station) and a plurality of terminal devices 10. The plurality of terminal devices 10 communicate with the base station. In downlink, the base station communicates with a terminal device 10B over a downlink channel. In uplink, a terminal device 10A communicates with the base station over an uplink channel. The downlink refers to a direction in which the base station sends data to the terminal device, and the uplink refers to a direction in which the terminal device sends data to the base station.

It should be understood that technical solutions in embodiments of the present invention may be applied to communications systems of various access standards, for example, a LTE system, an LTE frequency division duplex (FDD) system, an LTE time division duplex (TDD) communications system, a fifth generation (5G) LTE system, a 5G new radio (NR) system, a subsequent evolution system, or a converged system of a plurality of access standards.

It should further be understood that in the embodiments of the present invention, the terminal device (terminal equipment) may be referred to as a terminal, user equipment (UE), a mobile station (MS), a mobile terminal, a laptop computer, or the like. The terminal device may communicate with one or more core networks by using a radio access network (RAN). For example, the terminal device may be a mobile phone (also referred to as a "cellular" phone) or a computer with a mobile terminal. For example, the terminal device may alternatively be a portable, pocket-sized, handheld, computer built-in, or vehicle-mounted mobile apparatus, which exchanges voice and/or data with the RAN.

In the embodiments of the present invention, the base station may be an evolved node B ("eNB or e-NodeB" for short) in an LTE system, a base station in a 5G LTE system, a base station in a 5G NR system, another base station, or a network device such as a relay. The present invention is not limited thereto.

The following describes in detail a wireless communication method provided in an embodiment of the present invention with reference to the accompanying drawings.

Figure 5:
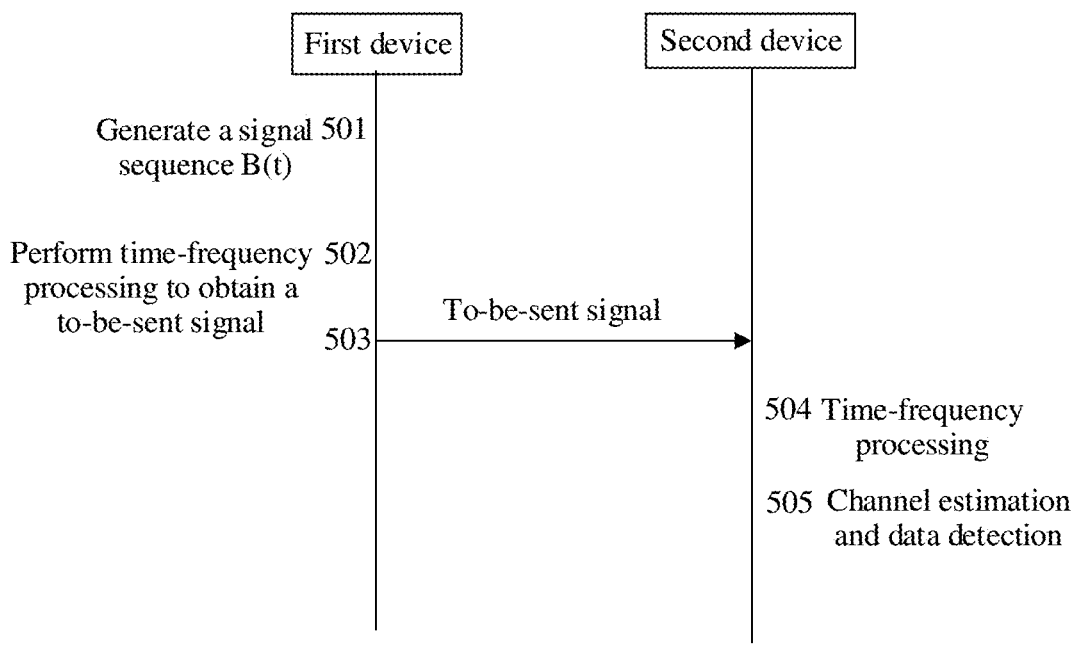
FIG. 5 is a schematic diagram of data sending in an embodiment of the present invention.

FIG. 5 is a schematic flowchart of a wireless communication method according to an embodiment of the present invention; In FIG. 5, a first device may be a sending device, and a second device may be a receiving device. The sending device may be a terminal or may be a base station, and the receiving device may be a base station or may be a terminal.

Figure 4:
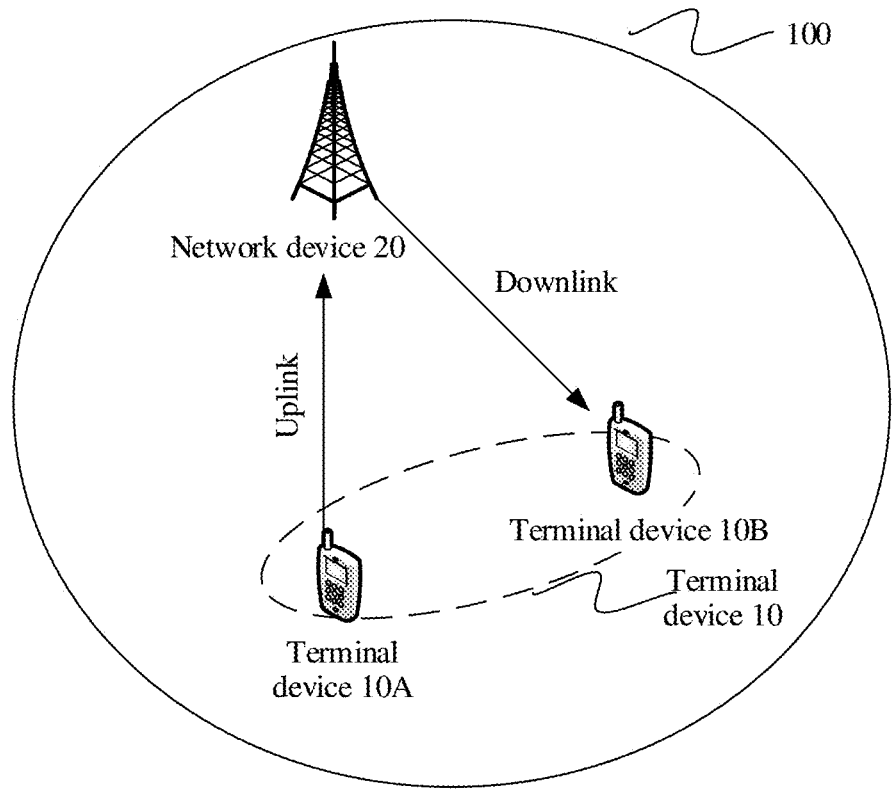
FIG. 4 is a schematic diagram of a communications system in an embodiment of the present invention.

For example, when the first device in FIG. 5 is a terminal such as the terminal device 10 in FIG. 4, the second device is a base station such as the network device 20 in FIG. 4.

When the first device in FIG. 5 is a base station such as the network device 20 in FIG. 4, the second device is a terminal such as the terminal device 10 in FIG. 4.

To better describe this application, some features of DFT are first described.

1. DFT is a linear system:

$$DFT(a \times x_1(i) + b \times x_2(i)) = DFT(a \times x_1(i)) + DFT(b \times x_2(i))$$

where a and b are any constants. DFT(x) means performing discrete Fourier transform on a sequence x, and $x_1(i)$ and $x_2(i)$ are two equal-length sequences.

2. If a sequence x(i) meets a same-number repetition characteristic, $0 \leq i \leq 2 \times N - 1$. Let y=DFT(x); and then an element on an even index of y is 0. For example:

$$x(i) = [1, 2, 3, 4, 1, 2, 3, 4]$$

$$y(i) = [7.07, 0, -1.41+1.41j, 0, -1.41, 0, -1.41-1.41j, 0]$$

3. If the sequence x(i) meets an inverse-number repetition characteristic, $0 \leq i \leq 2 \times N - 1$. Let y=DFT(x); and then an element on an odd index of y is 0:

$$x(i) = [1, 2, 3, 4, -1, -2, -3, -4]$$

$$y(i) = [0, -0.29-5.12j, 0, 1.71-0.88j, 0, 1.71+0.88j, 0, -0.29+5.12j]$$

Same-number repetition in this application means that, for a sequence x(I) that includes 2×N elements, I is an integer, $0 \leq I \leq 2 \times N - 1$, N is a positive integer, and in x(I), a $k^{th}$ element is equal to a $(k+M)^{th}$ element. That is, x(k)=x(k+M), and $0 \leq k \leq N-1$. Inverse-number repetition refers to x(k)=−x(k+M).

Because FFT is a fast algorithm of DFT, IFFT is a fast algorithm of IDFT. In this application, FFT and DFT may be replaced with each other; and IFFT and IDFT may be replaced with each other.

In this application, a transmit end device generates a signal before DFT transform is performed, where the signal includes 2×M signal elements. The 2×M signal elements include elements in two element groups A and B, the elements in the two element groups respectively meet same-number repetition and inverse-number repetition characteristics, and the 2×M signal elements further include another element group C that does not need to meet the same-number repetition/inverse-number repetition characteristics. After DFT transform is performed on the 2×M signal elements, the two element groups are orthogonal to each other in frequency domain. The element of the element group A and an element of the element group C are multiplexed before DFT, and there is an interval, so that the element group A is not interfered by the element group B or the element group C. In addition, no dedicated guard interval is required, thereby improving system resource utilization.

As shown in FIG. 5, in part 501, the first device generates a signal sequence B {(t)}.

The signal sequence {B(t)} includes 2×M elements, namely, 2M elements, t is an integer, and $0 \leq t \leq 2 \times M-1$. B(t) is an element of {B(t)}, and B(t) meets B(t)=S(t)+Y(t). S(t) is an element in a signal sequence {S(t)}. {S(t)} also includes 2M elements. Y(t) is an element in a signal sequence {Y(t)}.

The signal sequence {B(t)} may be understood as superposition (or multiplexing) of the signal sequence {S(t)} and another signal sequence. It may be understood that the signal sequence {B(t)} may alternatively be superposition (or multiplexing) of the signal sequence {S(t)} and one or more sequences, in other words, the signal sequence {Y(t)} may be considered as superposition (or multiplexing) of a plurality of sequences. The signal sequence {B(t)} may alternatively be the signal sequence {S(t)}, that is, B(t)=S(t). It may be understood that in this case, B(t)=S(t)+Y(t), where Y(t) is 0. An expression manner of {B(t)} is not limited in this application.

Figure 6A:
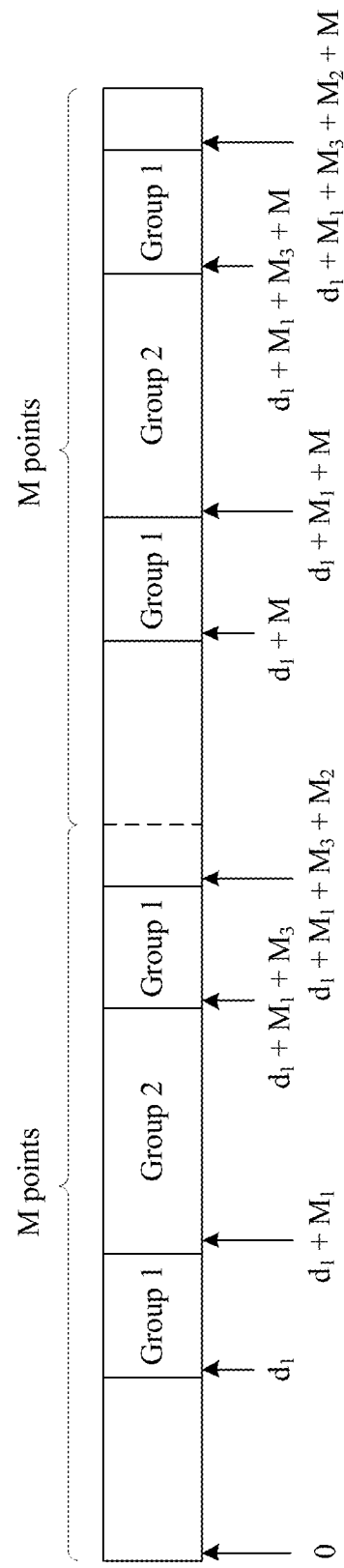
FIG. 6a is a schematic diagram of a signal sequence {S(t)} of 2×M elements.

FIG. 6a shows a schematic diagram of S(t). A signal sequence {S(t)} includes a first element group and a second element group. In FIG. 6a, the first element group and the second element group are respectively represented by a group 1 and a group 2. The first element group includes $2 \times M_1 + 2 \times M_2$ elements, and the second element group includes $2 \times M_3$ elements, where $M_1 + M_2 + M_3 < M$, $M_1$ and $M_2$ are integers greater than or equal to 0, $M_3$ is an integer greater than 0, $M_1 + M_2$ is greater than or equal to 0, and M is an integer greater than 2. The second element group includes at least one non-zero element, and the first element group includes at least one non-zero element.

Figure 6B:
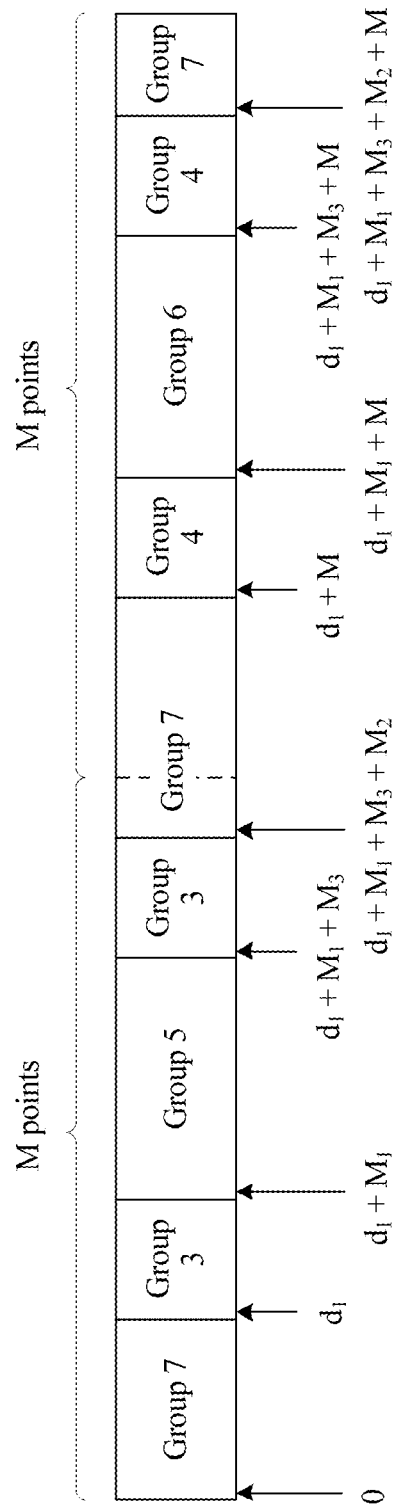
FIG. 6b is another schematic diagram of a signal sequence {S(t)} of 2×M elements.

The first element group includes a third element group (group 3 in FIG. 6b) and a fourth element group (group 4 in FIG. 6b), and the second element group includes a fifth element group (group 5 in FIG. 6b) and a sixth element group (group 6 in FIG. 6b), as shown in FIG. 6b. A character t ($0 \leq t \leq 2 \times M-1$) is equivalent to an index, indicating a location of an element in the sequence S(t). For example, t=0 refers to an element whose index is 0 in S(t). S(0) is at the first location of S(t). S(k) is at a $(k+1)^{th}$ location of S(t). Similarly, the character t is also equivalent to an index of an element B(t) in {B(t)}. In one embodiment, an element Y(t) may be considered as an element in a signal sequence {Y(t)}. Then, the character t is also equivalent to an index of an element Y(t) in {Y(t)}.

In this application, to ensure that the index t in S(t), B(t), and Y(t) meets $0 \leq t \leq 2 \times M-1$, when a value of t or a value of t+M ranges from 0 to 2M−1, S(t)=S(t), S(t+M)=S(t+M), Y(t+M)=Y(t+M); or when a value of t or a value of t+M is greater than or equal to 2M, S(t)=S(tmod(2M)), S(t+M)=S((t+M)mod(2M)), Y(t+M)=Y((t+M)mod(2M)) or Y(t)=Y(t mod(2M)).

As shown in FIG. 6b, the third element group includes $M_1 + M_2$ elements S(t), where t includes all integers that meet the following condition:

$d_1 \leq t \leq d_1 + M_1 - 1$ or $d_1 + M_1 + M_3 \leq t \leq d_1 + M_1 + M_3 + M_2 - 1$, where $d_1$ is an integer greater than or equal to 0.

The fourth element group includes $M_1 + M_2$ elements S(t+M), where t includes all integers that meet the following conditions:

$d_1 \leq t \leq d_1 + M_1 - 1$ or $d_1 + M_1 + M_3 \leq t \leq d_1 + M_1 + M_3 + M_2 - 1$; and S(t)=a×S(t+M), where, a=1 or −1.

The fifth element group includes $M_3$ elements S(t), where t includes all integers that meet the following condition:

$$d_1 + M_1 \leq t \leq d_1 + M_1 + M_3 - 1$$

The sixth element group includes $M_3$ elements S(t+M), where t includes all integers that meet the following conditions:

$$d_1 + M_1 \leq t \leq d_1 + M_1 + M_3 - 1; \text{ and}$$

$$S(t) = -a \times S(t+M).$$

In {S(t)}, a seventh element group is further included, where the seventh element group includes at least one non-zero element, and an element in the seventh element group is S(t) when t meets the following conditions:

$0 \leq t \leq d_1 - 1$ or $d_1 + M_1 + M_3 + M_2 \leq t \leq d_1 + M - 1$ or $d_1 + M_1 + M_3 + M_2 + M \leq t \leq 2 \times M - 1$, and t is an integer.

The element included in the seventh element group is an element in {S(t)} except the elements included in the first element group and the second element group, as shown in the group 7 in FIG. 6a and FIG. 6b. The seventh element group includes $2 \times (M - M_1 - M_2 - M_3)$ elements. In addition, the $2 \times (M - M_1 - M_2 - M_3)$ elements carry $2 \times (M - M_1 - M_2 - M_3)$ information elements. One information element may be used to modulate a symbol or a reference signal element. One element may carry one information element, or a plurality of elements carry one information element. For example, when n elements (n is an integer greater than 1) carry one information element, the information element may become n elements after being repeated for n times. The n elements carry one information element. One reference signal element may be one reference signal, and one reference signal may be a complex number.

Any element S(t) in the seventh element group and a corresponding S(t+M) are not constrained by a same-number repetition characteristic or an inverse-number repetition characteristic, and $0 \leq t \leq 2 \times M - 1$. For example, the first terminal device generates S(t) and S(t+M) based on data. The data is generated randomly, and therefore values of S(t) and S(t+M) are irrelevant. S(t) and S(t+M) may meet the same-number repetition characteristic or the inverse-number repetition characteristic or may not meet the same-number repetition characteristic or the inverse-number repetition characteristic. However, the element in the seventh element group is not constrained by the same-number repetition characteristic or the inverse-number repetition characteristic. In other words, S(t) and S(t+M) do not necessarily meet the same-number repetition characteristic or the inverse-number repetition characteristic. The element S(t+M) cannot be obtained based on the element S(t).

In one embodiment, at least one element in the seventh element group does not meet S(t)=a×S((t+M)mod(2M)), where t is an index corresponding to an element in the seventh element group, and mod indicates a modulo operation. That is, not all elements in the seventh element group need to meet the same-sign/inverse-number repetition characteristic to ensure that the element in the seventh element group is orthogonal to the element in the second element group in frequency domain, so that utilization efficiency of a time-frequency resource can be improved. The elements in the seventh element group may be separated in time domain, for example, the elements in the seventh element group may be separated in time domain by using a protection element.

According to the foregoing description, it may be learned that the signal sequence $\{S(t)\}$ meets the following segment characteristics:

When $d_1 \le t \le d_1+M_1-1$ or $d_1+M_1+M_3 \le t \le d_1+M_1+M_3+M_2-1$, $S(t)=a \times S(t+M)$. This means that the element in the first element group meets the same-number repetition characteristic or the inverse-number repetition characteristic.

When $d_1+M_1 \le t \le d_1+M_1+M_3-1$, $S(t)=-a \times S(t+M)$. This means that the element in the second element group meets the same-number repetition characteristic or the inverse-number repetition characteristic. However, the repetition characteristic of the element in the second element group is different from that of the element in the first element group. One has the same-number repetition characteristic, and the other has the inverse-number repetition characteristic.

When $0 \le t \le d_1-1$ or $d_1+M_1+M_3+M_2 \le t \le d_1+M-1$ or $d_1+M_1+M_3+M_2+M \le t \le 2 \times M-1$, $S(t)$ carries $2 \times (M-M_1-M_2-M_3)$ information elements. Alternatively, at least one element $S(t)$ does not meet $S(t)=a \times S(t+M)$. This part is the seventh element group.

The element of the first element group and the element in the second element group respectively meet the same-number repetition characteristic and the inverse-number repetition characteristic, for example, the foregoing DFT characteristic, interference, between the first element group and the second element group, brought by a multipath effect on a receiving side may be avoided. In addition, there is no guard interval between the first element group and the second element group, so that system resource utilization is improved.

When $M_1+M_2=0$, the first element group is an empty set. The first element group does not include any non-zero element. The first element group in the present invention may be an empty set.

In one embodiment, Y(t) includes at least one non-zero element, and Y(t) meets $Y(t)=a \times Y((t+M) \bmod (2M))$, where t is an index corresponding to Y(t), t=0 to $2 \times M-1$, and mod indicates a modulo operation. A value range of a mod K operation in this application is 0 to K−1, where K is a positive integer. For example, a value of 10 mod 8 is 2. Because of the same-sign/inverse-number repetition characteristic of Y(t), Y(t) is orthogonal to the element in the second group in frequency domain. Therefore, Y(t) has little interference on the element in the second group. Interference from the element in the seventh group to the element in the second group may be overcome by using a protection element in the second group. For example, elements except the protection element in the second group are far from the element in the seventh group, and are not interfered by a multipath effect of the element in the seventh group. To obtain a low PAPR, Y(t) and S(t) are not both non-zero elements for a same t; or one of Y(t) and S(t) is a real number, and the other is a pure imaginary number, except that Y(t) and S(t) have a common complex number factor.

In an example, the first element group carries $M_1+M_2$ information elements, and the $M_1+M_2$ information elements are at least one piece of the following information: data, control information, and data and control information.

The second element group carries $M_3$ information elements, and the $M_3$ information elements are reference signal elements or at least one piece of the following information: data, control information, and data and control information.

For example, the third element group and the fourth element group in the first element group include $2 \times (M_1+M_2)$ elements. However, because the element in the fourth element group is same-number repetition of the element in the third element group, or the element in the fourth element group is inverse-number repetition of the element in the third element group, and the foregoing constraint relationship exists between the third element group and the fourth element group, the third element group and the fourth element group carry only $M_1+M_2$ information elements. Similarly, although the fifth element group and the sixth element group in the first element group include $2 \times M_3$ elements, the $2 \times M_3$ elements carry only $M_3$ information elements. However, the element in the seventh element group is not constrained by a relationship of same-number repetition or inverse-number repetition. Therefore, each element in the seventh element group may independently carry an information element, $\{S(t)\}$ includes the seventh element group, and the seventh element group includes at least one non-zero element. When the first device generates $\{B(t)\}$ in the foregoing manner and sends $\{B(t)\}$ to the second device, the second device may receive more information while being free from interference between the first element group and the second element group, thereby improving system resource utilization.

Figure 7:
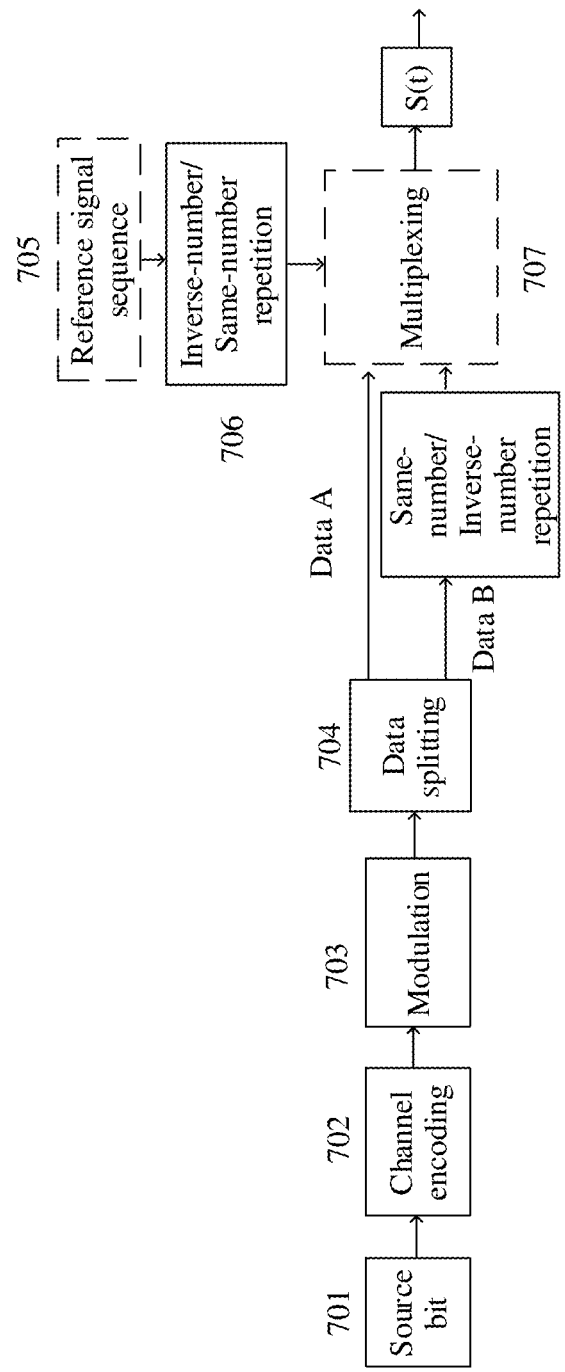
FIG. 7 is a schematic diagram of generating a signal sequence {S(t)}.

In an instance, as shown in FIG. 7, a process of generating S(t) is provided, where $0 \le t \le 2 \times M-1$.

Part 701: The first device generates a data bit to be transmitted.

Part 702: The first device performs channel coding on the data bit to form an encoded bit.

Part 703: The first device modulates the encoded bit to obtain a modulation symbol sequence. The encoded bit includes two parts: modulation symbol data B on which same-sign/inverse-number repetition is performed, and modulation symbol data A on which same-sign/inverse-number repetition is not performed. The data A is the seventh element group (group 7 in FIG. 6b), and the data B is the first element group (group 1 in FIG. 6b). The data B is also a modulation symbol sequence B. The data A is also a modulation symbol sequence A. Modulation may be binary phase shift keying (BPSK), quadrature phase shift keying (QPSK), 16-quadrature amplitude modulation (QAM), 64 QAM, 256 QAM, or the like. For example, a modulation scheme is QPSK, and two encoded bits are mapped to one QPSK modulation symbol. If there are 100 encoded bits, 50 modulation symbols are obtained after QPSK modulation is performed.

Part 704: Perform same-sign or inverse-number repetition on the modulation symbol sequence B.

Part 705: The first device generates a reference signal sequence or another signal. The reference signal sequence or the another signal may include a plurality of elements, where each element is a complex number. The reference signal is generated according to a predefined repetition rule. The reference signal sequence is the second element group (group 2 in FIG. 6a).

Part 706: The first device performs same-sign or inverse-number repetition on the reference signal sequence generated in Part 705. In addition, a repetition manner of the reference signal is different from a repetition manner of the modulation symbol sequence B. One of the repetition manners is same-number repetition, and the other is inverse-number repetition.

Part 707: The first device combines the reference signal sequence (group 2), the modulation symbol sequence A (group 7), and the modulation symbol sequence B (group 1). The first device may combine the modulation symbol sequence and the reference signal sequence according to a predefined rule to generate S(t). For example, M=12, the modulation symbol sequence has 18 modulation symbols, and the reference signal sequence has six reference signal elements, and $M_3=3$. The 18 modulation symbols include two parts, where two modulation symbols are same-number repetitions of two modulation symbols in the other 16 modulation symbols, $M_1+M_2=2$, $M_1=1$, and $M_2=1$. Of the six reference signal elements, three reference signal elements are inverse-number repetitions of the other three reference signal elements. The 16 modulation symbols are T1, T2, . . . , and T16, and the two modulation symbols with same-number repetitions are T1 and T2. The three reference signal elements are R1, R2, and R3, and the three reference signal elements with inverse-number repetitions are −R1, −R2, and −R3. $d_1=0$. S(t) generated according to the predefined rule is S(0)=T1, S(1)=R1, S(2)=R2, S(3)=R3, S(4)=T2, S(5)=T3, S(6)=T4, S(7)=T5, S(8)=T6, S(9)=T7, S(10)=T8, S(11)=T9, S(12)=T1, S(13)=−R1, S(14)=−R2, S(15)=−R3, S(16)=T2, S(17)=T10, S(18)=T11, S(19)=T12, S(20)=T13, S(21)=T14, S(22)=T15, and S(23)=T16. Referring to FIG. 6a and FIG. 6b, S(t) for transmitting T1 and T2 is a group 1, where t=0, 4, 12, and 16; S(t) for transmitting R1, R2, R3, −R1, −R2, and −R3 is a group 2, where t=1, 2, 3, 13, 14, and 15; and S(t) for transmitting T3, T4, T5, T6, . . . , and T16 is a group 7, where t=5, 6, 7, 8, 9, 10, 11, 17, 18, 19, 20, 21, 22, and 23. That is, multiplexing of multi-channel signals is performed according to the manners in FIG. 6a and FIG. 6b.

Figure 7A:
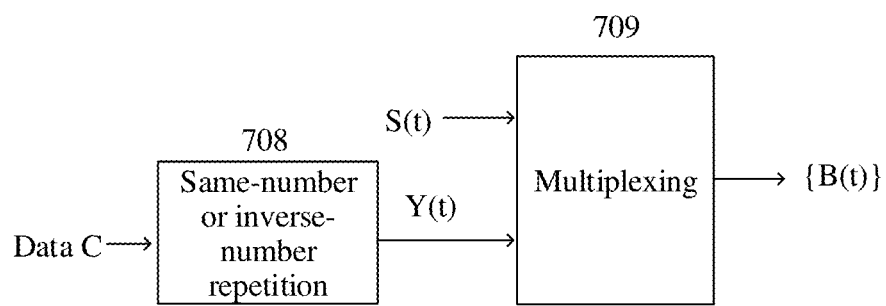
FIG. 7a is a schematic diagram of generating a signal sequence {B(t)}.

FIG. 7a is a schematic diagram of generating {B(t)} by the first device.

In FIG. 7a, same-sign or inverse-number repetition is performed on data C in Part 708 to obtain Y(t).

In Part 709, S(t) and Y(t) are multiplexed to obtain B(t), and $0 \le t \le 2 \times M-1$. A multiplexing manner of Y(t) and S(t) is B(t)=Y(t)+S(t).

An element in {S(t)} may be a reference signal element, or may be a modulation symbol.

In an example, when t meets the following condition, Y(t)=0:

$0 \le t \le 2 \times M-1$, and t is an integer. In this case, B(t)=S(t). The first device generates {S(t)} as well as {B(t)} in this case.

In an example, for Y(t), when t meets the following condition, Y(t)=0:

$0 \le t \le d_1+M_1-1$ or $d_1+M_1+M_3 \le t \le d_1+M_1+M-1$ or $d_1+M_1+M_3+M \le t \le 2 \times M-1$.

When t meets the following conditions, at least one Y(t) is not equal to 0, $d_1+M_1 \le t \le d_1+M_1+M_3-1$; for Y(t) that is not equal to 0, Y(t+M)=a×Y(t); and when Y(t) is not equal to 0, t further meets:

$S(t)=A_1 \times c(t)$, and $Y(t)=A_2 \times j \times c(t)$ or $Y(t)=-j \times A_2 \times c(t)$, where c(t) is a non-zero complex number, $A_1$ is a non-zero real number, $A_2$ is a non-zero real number, j is an imaginary unit, and $j^2=-1$, namely, $j=\sqrt{-1}$.

$A_1$ and $A_2$ may be used to adjust a power allocation ratio between Y(t) and S(t). For example, when the second group of elements $2 \times M_3=4$, $A_1=\text{sqrt}(\frac{3}{4})$, and $A_2=\frac{1}{2}$, where sqrt(x) represents finding a square root of x. When $2 \times M_3=6$, $A_1=\text{sqrt}(\frac{5}{6})$, and $A_2=\text{sqrt}(\frac{1}{6})$. When $2 \times M_3=8$, $A_1=\text{sqrt}(\frac{6}{7})$, and $A_2=\text{sqrt}(\frac{1}{7})$. When $2 \times M_3=10$, $A_1=\text{sqrt}(\frac{9}{10})$, and $A_2=\text{sqrt}(\frac{1}{10})$. Resources may be allocated to the second group of elements at a smaller granularity.

Y(t) may be determined as $A_2 \times j \times c(t)$ or $-j \times A_2 \times c(t)$ based on modulation information. For example, for BPSK modulation, information 0 may be mapped to $A_2 \times j \times c(t)$, and information 1 may be mapped to $-j \times A_2 \times c(t)$. c(t) is a predefined complex number, and a complex number of a norm may be selected to ensure constant power. For example, c(t) may be a predefined reference signal sequence.

For example, the element in the second element group is a reference signal element, that is, the group 2 in FIG. 6a is a reference signal. Except the element in the second element group, a remaining element in {S(t)} is used to carry data. In the foregoing, a non-zero Y(t) is added to an element, in {S(t)}, whose index belongs to the second element group. That is, data is superposed on the reference signal. Because a non-zero part of Y(t) is consistent with a repetition characteristic of a data part of S(t), Y(t) that is not zero does not interfere with the element (reference signal) in the second element group in the sequence set {S(t)} on a receive end.

In addition, Y(t) and the reference signal S(t) in {S(t)} meet the following relationship:

$S(t)=A_1 \times c(t)$, and $Y(t)=A_2 \times j \times c(t)$ or $Y(t)=-j \times A_2 \times c(t)$.

With the foregoing signal design, in the added two signals, in addition to including a complex number c(t), one is a real number and the other is an imaginary number, so that a low PAPR can be maintained during signal sending.

c(t) may have a constant modulus, that is, |c(t)|=constant.

It is assumed that $d_1=2$, $M_1=1$, $M_3=6$, M=12, $A_1=1$, $A_2=2$, c(t)=1+j, and a=1. The first device generates S(t) first, where $0 \le t \le 23$; and then generates a sequence Y(t) equal to S(t) in length, where $0 \le t \le 23$, Y(3) is not equal to 0, Y(15)=Y(3)=1+j, Y(t)=0, $0 \le t \le 2$, or $4 \le t \le 14$ or $16 \le t \le 23$. The first device adds S(t) and Y(t) to generate B(t). The first device may further generate B(t) in the following manner. The first device first generates S(t), where $0 \le t \le 23$; and then generates a sequence Y(t) equal to S(t) in length, where $0 \le t \le 23$, Y(t) is not equal to 0, and $3 \le t \le 8$. The first device adds S(t) and Y(t) to generate B(t).

In an example, at least one of a value of $M_1$, a value of $M_2$, and a value of $M_3$ is a predefined value. In this way, signaling overheads in a system can be reduced.

In an example, the first device receives signaling, and the first device obtains at least one of a value of $M_1$, a value of $M_2$, and a value of $M_3$ based on the signaling. The signaling may be carried in a radio resource control (RRC) message, or may be carried on a control channel of a physical layer. In FIG. 5, in case of uplink data transmission, the first device is a terminal device. The second device is a network device, and the signaling is sent by the second device to the first device. In one embodiment, the first device sends signaling, where the signaling is used to indicate at least one of a value of $M_1$, a value of $M_2$, and a value of $M_3$. In FIG. 5, in case of downlink data transmission, the first device is a network device. The second device is a terminal device, and the signaling is sent by the first device to the second device.

In an example, $M_1$ is greater than 0, and $M_2$ is greater than 0. The second element group can be free from multipath interference from the first element group on a receive end (the second device) by properly setting values of $M_1$ and $M_2$. $M_1$ is greater than 0, and because of protection of the first element group, it may be ensured that after an element in the seventh element group passes through a plurality of channels, signals superposed on an element in the second element group have less interference; and if $M_2$ is greater than 0, it may be ensured that after the element in the second element group passes through a plurality of channels, at least some signals are not superposed on the element in the seventh element group. Therefore, it may be relatively easy for a receiver to separate the signal of the element in the second element group.

In part 502, the first device performs time-frequency processing on {B(t)} to obtain a to-be-sent signal.

Figure 7B:
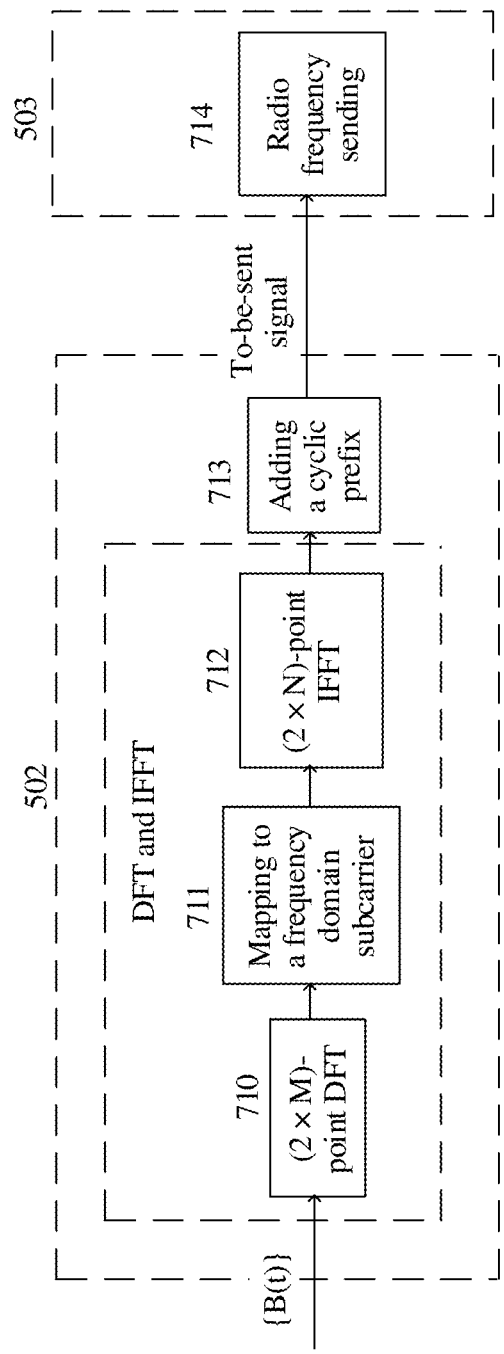
FIG. 7b is a schematic diagram of sending a signal sequence {B(t)} in a DFT-s-OFDM manner.

In an example, FIG. 7b is a schematic diagram in which a first device sends a signal sequence {B(t)} in a DFT-s-OFDM manner. Input in FIG. 7b is the signal sequence {B(t)} output in FIG. 7a.

In part 710, the first device performs (2×M)-point DFT on the signal sequence {B(t)} to obtain a signal $B_F(t)$, where $0 \leq t \leq 2 \times M-1$.

In part 711, the first device maps $B_F(t)$ to a subcarrier in frequency domain. The mapping to the subcarrier in frequency domain means that a specific subcarrier is used to carry a specific modulation symbol or reference signal element. For example, the first device has 2×N subcarriers in frequency domain, and 2×N−2×M 0s or 2×N−2×M other data are filled into a subcarrier to which $B_F(t)$ is not mapped.

Figure 7C:
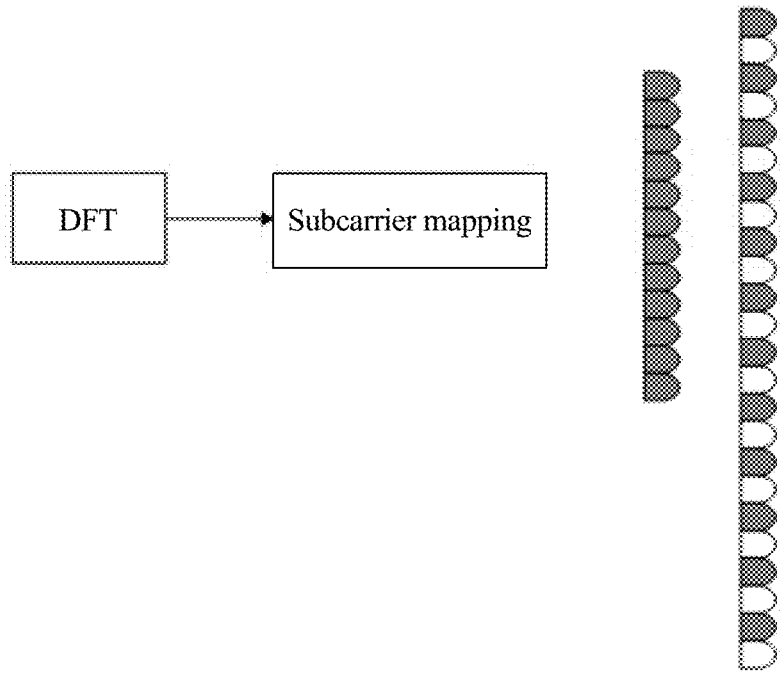
FIG. 7c is a schematic diagram of subcarrier mapping.
Figure 7D:
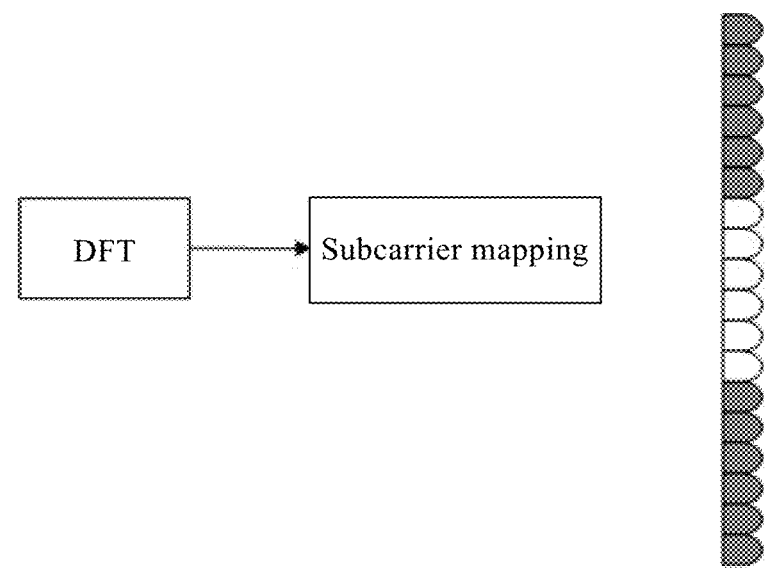
FIG. 7d is another schematic diagram of subcarrier mapping.

FIG. 7c and FIG. 7d provide schematic diagrams of subcarrier mapping in part 711. As shown in FIG. 7c and FIG. 7d, gray parts represent subcarriers that are occupied by signal $B_F(t)$, and the subcarriers may be consecutive subcarriers or subcarriers distributed with equal intervals. A mapping sequence may be as follows: According to a sequence of $B_F(t)$ elements, signals are mapped to the subcarriers successively in descending order or ascending order of subcarrier frequency. The subcarriers occupied by $B_F(t)$ may alternatively be two subcarrier blocks. As shown in FIG. 7d, there are two subcarrier blocks, and each block has six subcarriers. The subcarriers in each block are consecutive, or distributed with equal intervals. If there are two subcarrier blocks, a PAPR may be reduced, but there is an advantage of frequency diversity. For one subcarrier block, subcarriers within the block are distributed with equal intervals, and a PAPR is relatively high.

In part 711, by subcarrier mapping, the first device obtains a signal that includes 2×N elements after the subcarrier mapping. In part 712, the first device performs (2×N)-point IFFT on the data obtained after the subcarrier mapping to obtain a signal $B_T(t)$ obtained after the (2×N)-point IFFT. $B_T(t)$ includes 2×N elements, where t is an integer, and $0 \leq t \leq 2 \times N-1$. Then, in part 713, the first device adds a cyclic prefix to the signal $B_T(t)$ to obtain a to-be-sent signal.

For example, M=2, N=4, and the first device has eight subcarriers in frequency domain. The first device performs 4-point DFT on B(t), where $0 \leq t \leq 3$, so as to obtain a signal $B_F(t)$, where $0 \leq t \leq 3$. After mapping $B_F(t)$ to subcarriers 0, 1, 2, and 3 in frequency domain, and filling four 0s in subcarriers 4, 5, 6, and 7, the first device performs 8-point IFFT on the filled frequency domain data obtained from eight sampling points, to obtain $B_T(t)$ that includes eight elements, where t is an integer, and $0 \leq t \leq 7$.

Figure 7E:
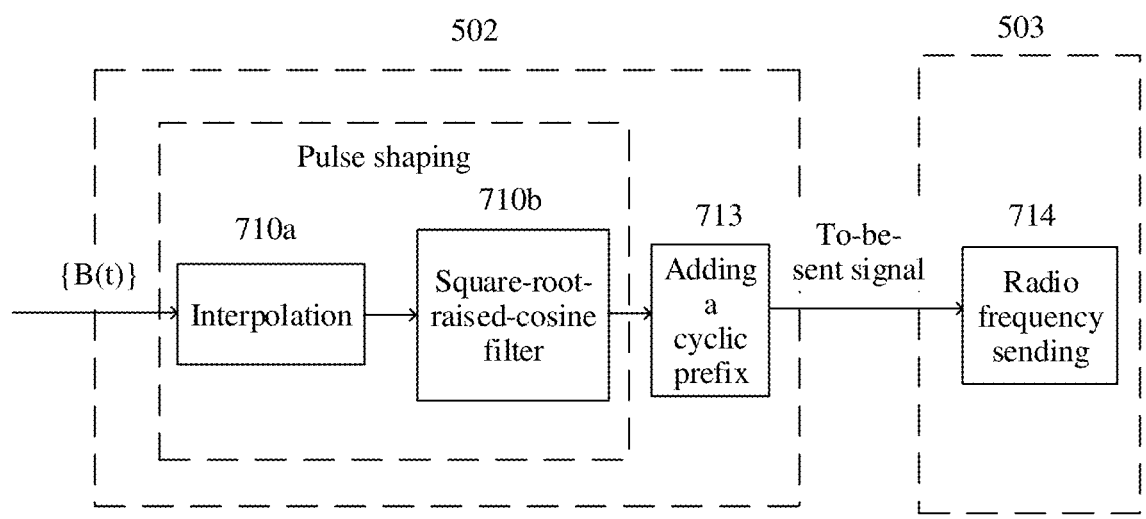
FIG. 7e is a schematic diagram of performing pulse shaping on a signal sequence {B(t)}.

In another example, the first device sends {B(t)} by adding a cyclic prefix and using a single carrier. As shown in FIG. 7e, the first device performs pulse shaping filtering on the signal sequence {B(t)} to generate a to-be-sent signal.

For example, the first device first performs oversampling on {B(t)}, and the oversampling may be implemented through interpolation (interpolation) on {B(t)}. For example, in four-time oversampling, three 0s are inserted into {B(t)} every four elements, to obtain a sequence B(0), 0, 0, 0, B(1), 0, 0, 0, . . . , B(2×M−1), 0, 0, 0. Then, the oversampled signal is processed by a pulse shaping filter to obtain a time-domain signal. FIG. 7e provides an example of implementing the foregoing method. In FIG. 7e, the first device performs interpolation on {B(t)} in part 710a to obtain an interpolated signal. Then, in part 710b, the first device processes the interpolated signal with a square-root-raised-cosine filter. Subsequent parts are the same as 713 and 714 in FIG. 7b, and details are not described herein. Compared with FIG. 7b, in FIG. 7e, units 710a and 710b are used to replace units 710, 711, and 711 in FIG. 7b. The rest remains unchanged.

Figure 8:
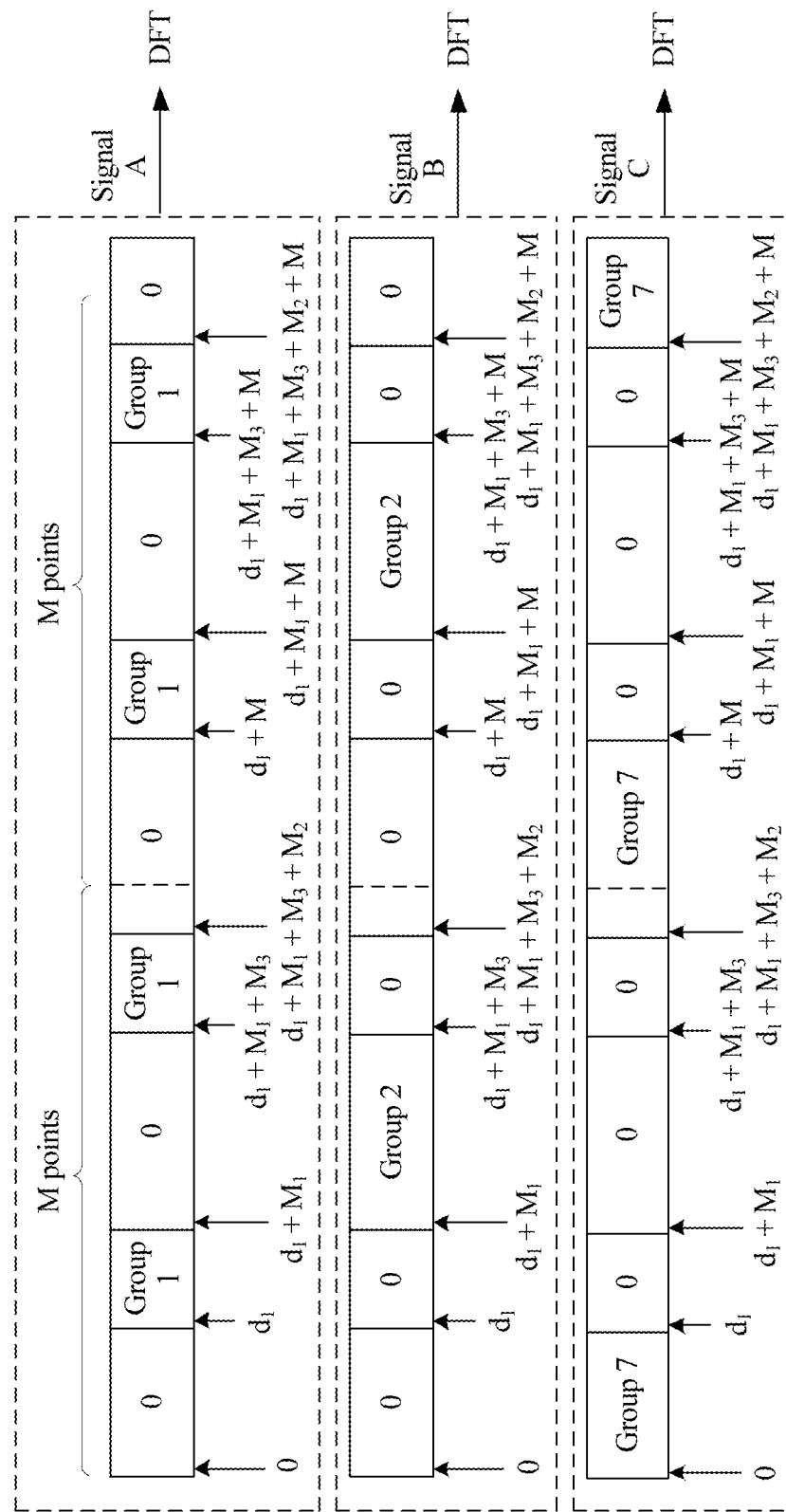
FIG. 8 is a schematic diagram of performing DFT on a signal sequence {S(t)}.

FIG. 8 is a schematic diagram of performing DFT on {S(t)}. In FIG. 8, a group 1, a group 2, and a group 7 separately include the signals in the group 1, the group 2, and the group 7 in FIG. 6a and FIG. 6b, and the signals are labeled as a signal A, a signal B, and a signal C. The signal A meets a same-number repetition characteristic, and occupies only an odd-number subcarrier after being mapped to frequency domain through DFT transform. The signal B meets an inverse-number repetition characteristic, and occupies only an even-number subcarrier after being mapped to frequency domain through DFT transform. According to FIG. 8, S(t)=signal A+signal B+signal C. Therefore, a signal obtained after DFT transform is performed on S(t) is a signal obtained through superposition of the signal A processed through DFT, the signal B processed through DFT, and the signal C processed through DFT, namely, DFT(S(t))=DFT(A)+DFT(B)+DFT(C). Similarly, DFT(B(t))=DFT(Y(t))+DFT(S(t)).

A subcarrier occupied by information obtained after the signal A is processed through DFT and a subcarrier occupied by information obtained after the signal B is processed through DFT are kept orthogonal to each other in frequency domain.

The signal A and the signal B are close to each other in time domain. However, because same-number repetition and inverse-number repetition are respectively performed on the signal A and the signal B, the subcarrier occupied by the information obtained after the signal A is processed through DFT and the subcarrier occupied by the information obtained after the signal B is processed through DFT are kept orthogonal to each other in frequency domain, and interference, between the signal A and the signal B, caused by a multipath effect can be avoided after B(t) passes through a channel. The signal C and the signal B are far away from each other in time domain. Therefore, if $M_1 > 0$, the signal C does not interfere with the signal B due to the multipath effect, and if $M_2 > 0$, the signal B does not interfere with the signal C due to the multipath effect. If $M_1 > 0$ and $M_2 > 0$, mutual interference between the signal C and the signal B is relatively small.

Similarly, interference between Y(t) and the signal B may also be avoided.

In the solution in the foregoing embodiment, interference between signals can be avoided, and some elements in an element group are repeated. Therefore, more information elements may be carried. In another design, same-number repetition or inverse-number repetition may be performed on other signals (the signal A and the signal C) different from the signal B to avoid interference between signals.

Part 503: The first device sends the to-be-sent signal to the second device.

In part 714 of FIG. 7b or FIG. 7e, the first device sends the to-be-sent signal.

{B(t)} sent by the first device to the second device arrives at the second device after passing through a channel, and is received by the second device. After receiving {B(t)}, the second device performs subsequent processing on the received signal. For details, refer to the following descriptions about part 504 and part 505.

In an example, the first device sends the to-be-sent signal on a PUCCH. In one embodiment, the first device sends the to-be-sent signal on a DFT-s-OFDM symbol on the PUCCH. It is not limited in this application that only one OFDM/DFT-S-OFDM symbol is used for transmission/receiving, and a plurality of OFDM/DFT-S-OFDM symbols may be included. At least one OFDM/DFT-S-OFDM symbol is transmitted or received by using the method in this application.

Part 504: The second device performs time-frequency processing on the received signal. As shown in parts 901 and 902 in FIG. 9a, the signal received by the second device is a second signal.

When the first device sends the signal in a manner shown in FIG. 7b, the second device samples the received second signal to obtain a first signal R(t).

When the first device sends the signal in a manner shown in FIG. 7e, the second device performs pulse shaping on the received second signal to obtain a first signal R(t). Performing pulse shaping on the received signal may be first processing the second signal by using a pulse shaping filter, where the pulse shaping filter may be a square-root-raised-cosine filter or the like. After the signal passes through the pulse shaping filter, the second device obtains a signal obtained after pulse shaping. If oversampling is performed on a transmit end, the second device on a receive end needs to perform downsampling on the signal obtained after pulse shaping to obtain a downsampled signal. The second device performs (2×M)-point DFT on the downsampled signal to obtain a third signal $R_F(t)$.

Downsampling may be implemented by performing decimation on the signal obtained after pulse shaping. By decimation and performing T-time downsampling, one value may be taken for every T values. For example, if the transmit end performs four-time oversampling, the receive end needs to perform four-time downsampling. It is assumed that the signal obtained after pulse shaping is $Z(0), Z(1), \ldots, Z(8\times M-1)$, and then the signal after downsampling is $Z(0), Z(3), \ldots, Z(8\times M-4)$.

Figure 9A:
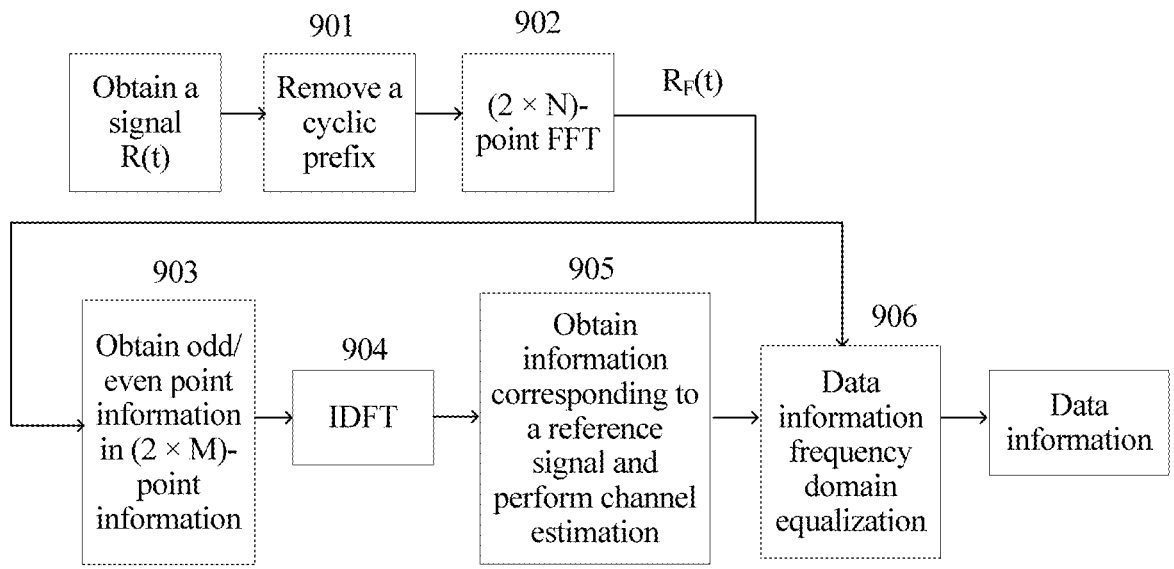
FIG. 9a is a schematic flowchart on a receive end.

Referring to FIG. 9a, in part 901, the second device removes a cyclic prefix of an obtained first signal R(t).

In part 902: Perform (2×N)-point FFT on the signal with the cyclic prefix removed to obtain a signal after (2×N)-point FFT is performed, and perform demapping according to a mapping rule, in frequency domain, of a signal sequence obtained after DFT is performed on a signal sequence {B(t)}. For example, if {B(t)} is mapped to 2×M subcarriers, signals on the 2×M subcarriers are taken to obtain a third signal $R_F(t)$, where the third signal includes 2×M elements.

When the first device sends the signal in the manner shown in FIG. 7b, N>M.

When the first device sends the signal in the manner shown in FIG. 7e, N=M.

Figure 9B:
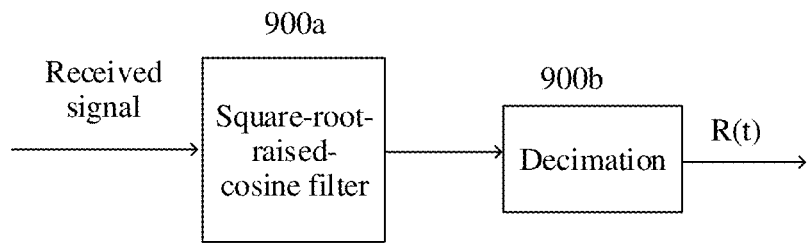
FIG. 9b is a schematic diagram of pulse shaping on a receive end.

In an example, the second device may obtain the first signal with reference to FIG. 9b.

In part 900a, the second device processes the received signal by using a square-root-raised-cosine filter.

In part 900b, the second device performs decimation on the square-root-raised-cosine filter to obtain the first signal R(t).

For part 505, the second device performs channel estimation and data detection. Refer to FIG. 9a.

When the element in the second element group in {S(t)} is a reference signal element, and the element in the first element group in {S(t)} and the element in the seventh element group in {S(t)} are data, the second device performs channel estimation and data detection in the following manner.

Part 903: The second device generates a fourth signal $R_{F\_rs}(t)$ based on the third signal $R_F(t)$, where t is an integer, $0 \le t \le 2\times M-1$, when t is an odd number, $R_{F\_rs}(t)=R_F(t)$, and when t is an even number, $R_{F\_rs}(t)=0$.

Alternatively, the second device generates a fourth signal $R_{F\_rs}(t)$ based on the third signal $R_F(t)$, where t is an integer, and $0 \le t \le 2\times M-1$. When t is an even number, $R_{F\_rs}(t)=R_F(t)$, and when t is an odd number, $R_{F\_rs}(t)=0$. That is, only a signal on an even-number subcarrier or an odd-number subcarrier is kept.

After odd/even point information is obtained, and IDFT is performed on the obtained information, a data part processed through same-sign/inverse-number repetition is filtered out, so that information of the obtained reference signal is not interfered by data information adjacent to the signal.

Part 904: The second device obtains a fifth signal $R_T(t)$ by performing IDFT on the fourth signal $R_{F\_rs}(t)$, where t is an integer, and $0 \le t \le 2\times M-1$.

In part 904, a data information part that is not repeated in time domain and information of the reference signal may be obtained.

Part 905: The second device generates a sixth signal $R_{T\_rs}(t)$ based on the fifth signal $R_T(t)$, where t is an integer, and $0 \le t \le 2\times M-1$.

When $d_1+M_1 \le t \le d_1+M_1+M_3+M_2-1$ or $d_1+M_1+M \le t \le d_1+M_1+M_3+M_2+M-1$, $R_{T\_rs}(t)=R_T(t)$; and when $0 \le t \le d_1+M_1-1$ or $d_1+M_1+M_3+M_2 \le t \le d_1+M_1+M-1$ or $d_1+M_1+M_3+M_2+M \le t \le 2\times M-1$, $R_{T\_rs}(t)=0$.

Part 905 is used to obtain information of a reference signal that is not interfered by the data information.

Part 906: The second device estimates a channel based on the sixth signal $R_{T\_rs}(t)$, where t is an integer, and $0 \le t \le 2\times M-1$.

Part 906 is used to obtain data information processed through frequency domain equalization.

The second device detects the signal sequence B(t) based on the channel. If {S(t)} does not include a reference signal, for example, the signal element in the second element group is not a reference signal, but a signal that carries other information, and {S(t)} includes only a data part, data of the second element group and data of the first element group are obtained in part 905, and the data do not interfere with each other. For example, the first device sends a signal to the second device on a plurality of DFT-s-OFDM symbols of the PUCCH. In addition, if the reference signal is located on another DFT-s-OFDM symbol that does not include {S(t)}, channel estimation may be performed by using a DFT-s-OFDM symbol that includes the reference signal, and then data is detected. In this case, channel estimation is not performed based on the sixth signal $R_{T\_rs}(t)$.

Refer to a method in the prior art for how to perform channel estimation by using a reference signal and for detecting a signal by using an estimated signal.

For example, $d_1=2$, $M_1=1$, $M_2=2$, $M_3=6$, $M=12$, and the second device removes the cyclic prefix of the first signal R(t), captures 24-point frequency domain information according to a mapping rule, on a frequency domain subcarrier, of a signal sequence obtained after a sequence B(t) is processed through DFT, and obtains the third signal $R_F(t)$ after 24-point DFT is performed, where t is an integer, and $0 \le t \le 23$.

The second device generates the fourth signal $R_{F\_rs}(t)$ based on the third signal $R_F(t)$, where t is an integer, $0 \le t \le 23$, when t is an odd number, $R_{F\_rs}(t)=R_F(t)$, and when t is an even number, $R_{F\_rs}(t)=0$.

The second device obtains the fifth signal $R_T(t)$ by performing 24-point IDFT on the fourth signal $R_{F\_rs}(t)$, where t is an integer, and $0 \le t \le 23$.

The second device generates the sixth signal $R_{T\_rs}(t)$ based on the fifth signal $R_T(t)$, where t is an integer, and $0 \le t \le 23$.

When $3 \leq t \leq 10$ or $15 \leq t \leq 22$, $R_{T\_rs}(t)=R_T(t)$, and when $0 \leq t \leq 2$ or $11 \leq t \leq 14$ or $22 \leq t \leq 23$, $R_{T\_rs}(t)=0$.

After generating a seventh signal $R_{F\_rs\_real}(t)$ by performing 24-point DFT on the sixth signal $R_{T\_rs}(t)$, the second device performs frequency domain equalization on the third signal $R_F(t)$ by using $R_{F\_rs\_real}(t)$ to generate an eighth signal $R_{T\_real}(t)$.

The second device detects the signal sequence B(t) by using the eighth signal $R_{T\_real}(t)$.

Therefore, in the wireless communication method in this embodiment of this application, interference, between two adjacent element groups, caused by the multipath effect on the receiving side may be avoided. In addition, system resource utilization is improved.

Figure 10:
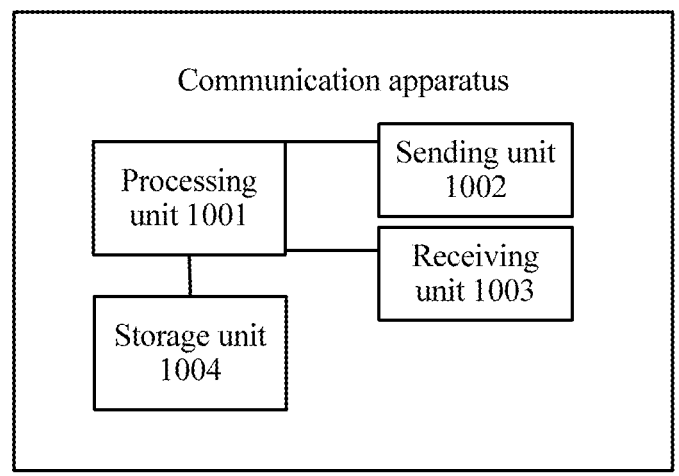
FIG. 10 is a schematic block diagram of a communication apparatus according to an embodiment of the present invention.

As shown in FIG. 10, an embodiment of the present invention provides a communication apparatus. The communication apparatus can be applied to the communications system shown in FIG. 4 to implement the method in the embodiment corresponding to FIG. 5. The communication apparatus may be the network device 20 in FIG. 5, or may be the terminal device 10 in FIG. 5. The communication apparatus may be the first device in FIG. 5, or may be the second device in FIG. 5.

When the communication apparatus is the first device in FIG. 5, the communication apparatus includes:

a processing unit and a storage unit. The storage unit stores an instruction, and the instruction is used to enable the processing unit to generate a signal sequence {B(t)} that includes 2×M elements, where t is an integer, and $0 \leq t \leq 2 \times M-1$, B(t) is an element in {B(t)}, B(t) meets B(t)=S(t)+Y(t), S(t) is an element in a signal sequence {S(t)}, the signal sequence {S(t)} includes a first element group and a second element group. The first element group includes $2 \times M_1 + 2 \times M_2$ elements, and the second element group includes $2 \times M_3$ elements, $M_1+M_2+M_3<M$, $M_1$ and $M_2$ are integers greater than or equal to 0, $M_3$ is an integer greater than 0, $M_1+M_2$ is greater than or equal to 0, and M is an integer greater than 2. The second element group includes at least one non-zero element, and the first element group includes at least one non-zero element or Y(t) includes at least one non-zero element. When Y(t) includes at least one non-zero element, Y(t) meets $Y(t)=a \times Y((t+M) \bmod (2M))$.

The first element group includes a third element group and a fourth element group, and the third element group includes $M_1+M_2$ elements S(t), where t includes all integers that meet the following condition:

$d_1 \leq t \leq d_1+M_1-1$ or $d_1+M_1+M_3 \leq t \leq d_1+M_1+M_3+M_2-1$, where $d_1$ is an integer greater than or equal to 0.

The fourth element group includes $M_1+M_2$ elements S(t+M), where t includes all integers that meet the following conditions:

$d_1 \leq t \leq d_1+M_1-1$ or $d_1+M_1+M_3 \leq t \leq d_1+M_1+M_3+M_2-1$; and $S(t)=a \times S(t+M)$, where, $a=1$ or $-1$.

The second element group includes a fifth element group and a sixth element group, and the fifth element group includes $M_3$ S(t), where t includes all integers that meet the following condition:

$d_1+M_1 \leq t \leq d_1+M_1+M_3-1$.

The sixth element group includes $M_3$ elements S(t+M), where t includes all integers that meet the following conditions:

$d_1+M_1 \leq t \leq d_1+M_1+M_3-1$; and $S(t)=-a \times S(t+M)$.

The signal sequence {S(t)} further includes a seventh element group, where the seventh element group includes at least one non-zero element, and the seventh element group carries $2 \times (M-M_1-M_2-M_3)$ information elements or at least one element in the seventh element group does not meet $S(t)=a \times S((t+M) \bmod (2M))$, where mod indicates a modulo operation, and an element in the seventh element group is:

S(t), where $0 \leq t \leq d_1-1$ or $d_1+M_1+M_3+M_2 \leq t \leq d_1+M-1$ or $d_1+M_1+M_3+M_2+M \leq t \leq 2 \times M-1$, and t is an integer.

The processing unit is further configured to map a signal sequence obtained by performing DFT on the signal sequence {B(t)}, to a frequency domain subcarrier, so as to generate a signal mapped to the frequency domain subcarrier; or the processing unit is further configured to perform pulse shaping filtering on the signal sequence {B(t)} to generate a signal processed through pulse shaping filtering.

In an example, the processing unit is further configured to perform IFFT on the signal mapped to a frequency domain subcarrier to generate a signal processed through IFFT.

The communication apparatus further includes:

a sending unit, configured to send the signal processed through IFFT.

In an example, the processing unit is further configured to perform IFFT on the signal mapped to a frequency domain subcarrier to generate a signal processed through IFFT.

In an example, the communication apparatus further includes:

a sending unit, configured to send the signal processed through pulse shaping filtering.

When the communication apparatus is the second device in FIG. 5, the communication apparatus includes:

a storage unit 1004 and a processing unit 1001, where the storage unit stores an instruction, and the instruction causes the processing unit to obtain a first signal R(t), where t is an integer, and $0 \leq t \leq 2 \times M-1$.

The first signal is generated based on a signal sequence B(t), where t is an integer, and $0 \leq t \leq 2 \times M-1$, B(t) is an element in {B(t)}, {B(t)} includes 2×M elements, B(t) meets B(t)=S(t)+Y(t), S(t) is an element in a signal sequence {S(t)}, and the signal sequence S(t) includes a first element group and a second element group. The first element group includes $2 \times M_1+2 \times M_2$ elements, the second element group includes $2 \times M_3$ elements, $M_1+M_2+M_3<M$, $M_1$ and $M_2$ are integers greater than or equal to 0, $M_3$ is an integer greater than 0, $M_1+M_2$ is greater than or equal to 0, and M is an integer greater than 2. The second element group includes at least one non-zero element, and the first element group includes at least one non-zero element or Y(t) includes at least one non-zero element. When Y(t) includes at least one non-zero element, Y(t) meets $Y(t)=a \times Y((t+M) \bmod (2M))$.

The first element group includes a third element group and a fourth element group, and the third element group includes $M_1+M_2$ elements S(t), where t includes all integers that meet the following condition:

$d_1 \leq t \leq d_1+M_1-1$ or $d_1+M_1+M_3 \leq t \leq d_1+M_1+M_3+M_2-1$, where $d_1$ is an integer greater than or equal to 0.

The fourth element group includes $M_1+M_2$ elements S(t+M), where t includes all integers that meet the following conditions:

$d_1 \leq t \leq d_1+M_1-1$ or $d_1+M_1+M_3 \leq t \leq d_1+M_1+M_3+M_2-1$; and $S(t)=a \times S(t+M)$, where, $a=1$ or $-1$.

The second element group includes a fifth element group and a sixth element group, and the fifth element group includes $M_3$ elements S(t), where t includes all integers that meet the following condition:

$d_1+M_1 \leq t \leq d_1+M_1+M_3-1$.

The sixth element group includes $M_3$ elements S(t+M), where t includes all integers that meet the following conditions:

$$d_1+M_1 \leq t \leq d_1+M_1+M_3-1; \text{ and}$$

$$S(t)=-a \times S(t+M).$$

The signal sequence {S(t)} further includes a seventh element group, where the seventh element group carries $2 \times (M-M_1-M_2-M_3)$ information elements or at least one element in the seventh element group does not meet $S(t)=a \times S((t+M) \bmod (2M))$, where mod indicates a modulo operation, and an element in the seventh element group is:

S(t), where $0 \leq t \leq d_1-1$ or $d_1+M_1+M_3+M_2 \leq t \leq d_1+M-1$ or $d_1+M_1+M_3+M_2+M \leq t \leq 2 \times M-1$, and t is an integer.

The processing unit is further configured to process the first signal R(t).

In an example, the communication apparatus further includes:

a receiving unit 1003, configured to receive signaling.

The processing unit 1001 is further configured to obtain at least one of a value of $M_1$, a value of $M_2$, and a value of $M_3$ based on the signaling.

In an example, the communication apparatus further includes:

a sending unit 1002, configured to send signaling, where the signaling indicates at least one of a value of $M_1$, a value of $M_2$, and a value of $M_3$.

In an example, the receiving unit is further configured to receive a second signal.

The processing unit 1001 is further configured to obtain R(t) after performing pulse shaping filtering on the second signal.

In an example, the processing unit 1001 is further configured to perform FFT on the first signal R(t) to obtain a third signal $R_F(t)$, where t is an integer, and $0 \leq t \leq 2 \times M-1$.

The processing unit 1001 is further configured to generate a fourth signal $R_{F\_rs}(t)$ based on the third signal $R_F(t)$, where t is an integer, $0 \leq t \leq 2 \times M-1$, when t is an odd number, $R_{F\_rs}(t)=R_F(t)$, and when t is an even number, $R_{F\_rs}(t)=0$; or the processing unit 1001 is further configured to generate a fourth signal $R_{F\_rs}(t)$ based on the third signal $R_F(t)$, where t is an integer, $0 \leq t \leq 2 \times M-1$, when t is an even number, $R_{F\_rs}(t)=R_F(t)$, and when t is an odd number, $R_{F\_rs}(t)=0$.

The processing unit 1001 is further configured to generate a fifth signal $R_T(t)$ by performing IDFT on the fourth signal $R_{F\_rs}(t)$, where t is an integer, and $0 \leq t \leq 2 \times M-1$.

The processing unit 1001 is further configured to generate a sixth signal $R_{T\_rs}(t)$ by performing IDFT on the fifth signal $R_T(t)$, where t is an integer, and $0 \leq t \leq 2 \times M-1$.

When $d_1+M_1 \leq t \leq d_1+M_1+M_3+M_2-1$ or $d_1+M_1+M \leq t \leq d_1+M_1+M_3+M_2+M-1$, $R_{T\_rs}(t)=R_T(t)$; and when $0 \leq t \leq d_1+M_1-1$ or $d_1+M_1+M_3+M_2 \leq t \leq d_1+M_1+M-1$ or $d_1+M_1+M_3+M_2+M \leq t \leq 2 \times M-1$, $R_{T\_rs}(t)=0$.

In an example, the processing unit 1001 is further configured to estimate a channel based on the sixth signal $R_{T\_rs}(t)$, where t is an integer, and $0 \leq t \leq 2 \times M-1$. The processing unit 1001 is further configured to detect the signal sequence {B(t)} based on the channel.

For the first element group, the second element group, {B(t)}, {S(t)}, the value of $M_1$, the value of $M_2$, the value of $M_3$, and another characteristic, refer to descriptions in the embodiment in FIG. 5, and details are not described again.

Therefore, the wireless communication apparatus in this embodiment of this application avoids interference, between two adjacent element groups, caused by a multipath effect on a receiving side. In addition, system resource utilization is improved.

Figure 11:
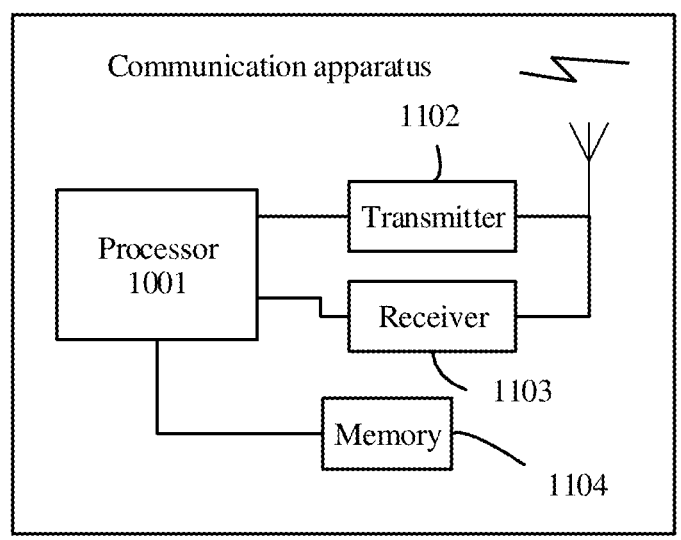
FIG. 11 is another schematic block diagram of a communication apparatus according to an embodiment of the present invention.

FIG. 11 is a possible schematic structural diagram of the communication apparatus in the foregoing embodiment.

The communication device can be applied to the communications system shown in FIG. 4 to implement the method in the embodiment corresponding to FIG. 5. The communication device may be the network device 20 in FIG. 4, or may be the terminal device 10 in FIG. 4. The communication device may be the first device in FIG. 5, or may be the second device in FIG. 5.

In a specific example, a structure of the communication apparatus includes a processor and a transmitter. The communication apparatus may alternatively include a transceiver, where the transceiver includes a transmitter and a receiver. In a specific example, when the communication apparatus is a network side device, the structure of the communication apparatus may further include a communication unit (for example, a communications interface), configured to support communication with another network side device, for example, communication with a core network node. In one embodiment, the structure of the communication apparatus may further include a memory, where the memory is configured to be coupled to the processor, and store a necessary program instruction and data of the communication apparatus. In the example corresponding to FIG. 11, the structure of the communication apparatus in this application includes a processor 1101, a transmitter 1102, a receiver 1103, and a memory 1104.

When the communication apparatus sends a signal, the to-be-sent signal is output via 1102 and transmitted by an antenna. When the communication apparatus receives a signal, the receiver 1103 receives a signal from the antenna.

The processor 1101 processes a to-be-sent signal or a to-be-received signal, for example, modulates to-be-sent data, generates a DFT-s-OFDM symbol, and generates {B(t)} in the foregoing embodiment. These units perform processing based on a radio access technology (for example, an access technology in LTE and another evolved system) used by a radio access network. The processor 1101 is configured to control and manage an action of the communication apparatus, and is configured to perform processing performed by the communication apparatus in the foregoing embodiment, for example, configured to control the communication apparatus to process to-be-sent data or to-be-received data and/or perform another process of a technology described in this application. The processor 1101 is further configured to support the communication apparatus in performing the processing process related to the communication apparatus in FIG. 5. For example, parts 501, 502, 504, and 505 in FIG. 5 may be implemented by the processor. The memory 1104 is configured to store program code and data of the communication apparatus.

A function of the processing unit 1001 in FIG. 10 may be implemented by the processor 1101 in FIG. 11. The processing unit 1001 in FIG. 10 may alternatively be the processor 1101 in FIG. 11. A function of the sending unit 1002 in FIG. 10 may be implemented by the transmitter 1102 in FIG. 11. The sending unit 1002 in FIG. 10 may alternatively be the sending unit 1002 in FIG. 11. A function of the receiving unit 1003 in FIG. 10 may be implemented by the receiver 1103 in FIG. 11. The receiving unit 1003 in FIG. 10 may alternatively be the receiver 1103 in FIG. 11. A function of the storage unit 1004 in FIG. 10 may be implemented by the memory 1004 in FIG. 11. The storage unit 1004 in FIG. 10 may alternatively be the memory 1004 in FIG. 11.

It may be understood that FIG. 11 shows merely a simplified design of the communication apparatus. In one embodiment, the communication apparatus may include any quantity of transmitters, receivers, processors, memories, and the like, and all data receiving devices that can implement this application fall within the protection scope of this application.

Figure 1:
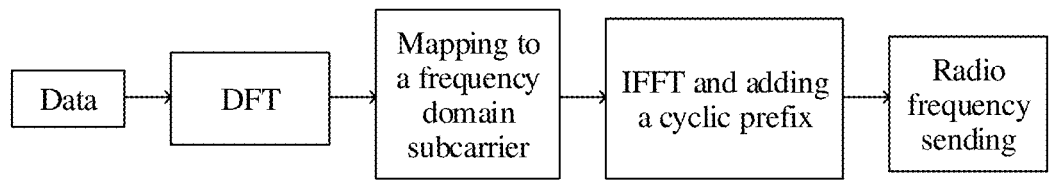
FIG. 1 is a schematic diagram of a DFT-s-OFDM data sending mode in an LTE system.
Figure 2:
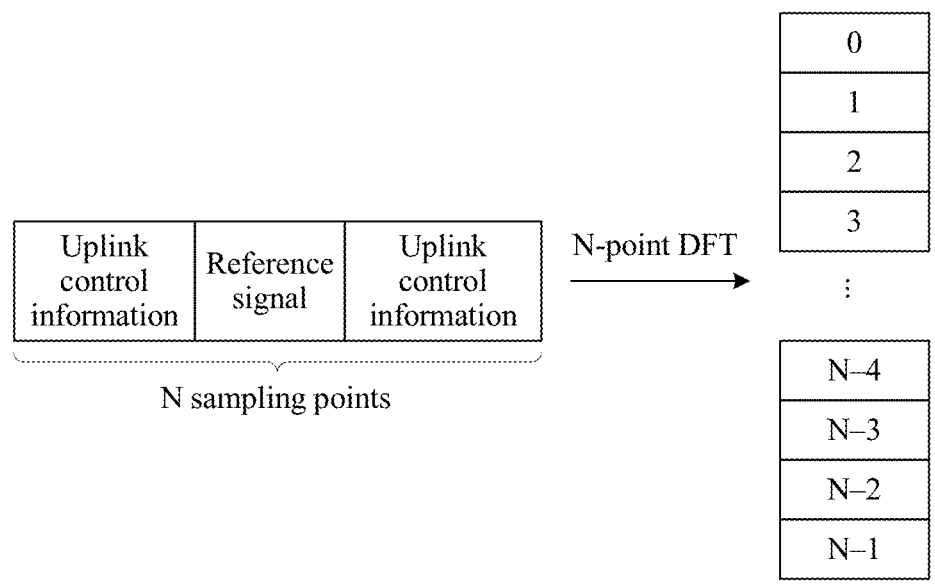
FIG. 2 is a schematic diagram of a pre-DFT data sending mode.
Figure 3:
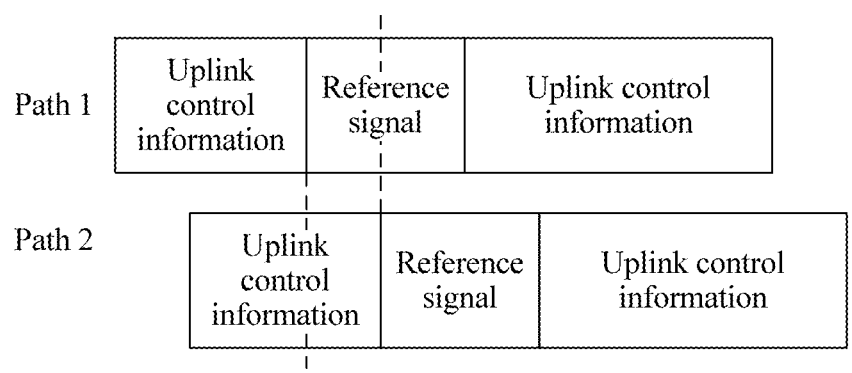
FIG. 3 is a schematic diagram of received-signal superposition caused by a multipath effect.

An embodiment of this application further provides a chip, which may perform the designs in FIG. 1, parts 501, 502, and 503, or parts 504 and 505 in FIG. 5, or the designs in FIG. 7, FIG. 7a, FIG. 7b, FIG. 7c, FIG. 7d, FIG. 7e, FIG. 9a, and FIG. 9b. The chip may include a corresponding functional unit in a figure, and execute a corresponding function.

The processor configured to perform functions of the foregoing communication apparatus in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The processor 1101 and the memory 1104 in FIG. 11 may alternatively be combined into one unit as a processor to implement functions of the processor 1101 and the memory 1104 in FIG. 11.

Method or algorithm operations described in combination with the content disclosed in this application may be implemented by using hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a data receiving device and/or a data sending device. Certainly, the processor and the storage medium may exist in a data receiving device or a data sending device as discrete components.

It may be clearly understood by persons of ordinary skill in the art that, for the purpose of convenient and brief description, division of the foregoing function modules is taken as an example for illustration. In one embodiment, the foregoing functions can be allocated to different function modules and implemented according to a requirement, that is, an inner structure of an apparatus is divided into different function modules to implement all or part of the functions described above. For a detailed working process of the foregoing apparatus, refer to a corresponding process in the foregoing method embodiments, and details are not described herein again.

Persons of ordinary skill in the art may understand that first, second, third, fourth, and various reference numerals in this specification are for distinguishing only for ease of description, and are not used to limit a scope of the embodiments of this application.

Persons of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)).

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made within the spirit and principle of the present invention shall fall within the protection scope of this application.

What is claimed is:

1. A wireless communication method, comprising:

generating a signal sequence $\{B(t)\}$ that comprises $2 \times M$ elements, wherein M and t are integers, and $0 \leq t \leq 2 \times M-1$, $B(t)$ is an element in the signal sequence $\{B(t)\}$, $B(t)$ meets $B(t)=S(t)+Y(t)$, $S(t)$ is an element in a signal sequence $\{S(t)\}$, and $Y(t)$ is an element in a signal sequence $\{Y(t)\}$;

the signal sequence $\{S(t)\}$ comprises a first element group and a second element group, the first element group comprises $2 \times M_1 + 2 \times M_2$ elements, and the second element group comprises $2 \times M_3$ elements, wherein $M_1 + M_2 + M_3 < M$, $M_1$ and $M_2$ are integers greater than or equal to 0, $M_3$ is an integer greater than 0, and $M_1 + M_2$ is greater than or equal to 0;

the first element group comprises a third element group that has $M_1+M_2$ elements and a fourth element group that has $M_1+M_2$ elements, wherein an element in the third element group is S(t mod (2M)) that meets a following condition: t meets $d_1 \le t \le d_1+M_1-1$ or $d_1+M_1+M_3 \le t \le d_1+M_1+M_3+M_2-1$, wherein $d_1$ is an integer greater than or equal to 0, and mod represents a modulo operation; and an element in the fourth element group is S((t+M)mod(2M)) that meets a following set of conditions: t meets $d_1 \le t \le d_1+M_1-1$ or $d_1+M_1+M_3 \le t \le d_1+M_1+M_3+M_2-1$, and S(t mod (2M))=a×S((t+M)mod(2M)), wherein a=1 or −1;

at least one element in the second element group is a non-zero element, and the second element group comprises a fifth element group that has $M_3$ elements and a sixth element group that has $M_3$ elements, wherein an element in the fifth element group is S(t mod (2M)) that meets a following condition: t meets $d_1+M_1 \le t \le d_1+M_1+M_3-1$; and an element in the sixth element group is S((t+M)mod(2M)) that meets a following set of conditions: t meets $d_1+M_1 \le t \le d_1+M_1+M_3-1$, and S(t mod (2M))=−a×S((t+M)mod(2M));

the signal sequence {S(t)} further comprises a seventh element group, wherein at least one element in the seventh element group is a non-zero element, and an element in the seventh element group is S(t mod (2M)) that meets a following condition: t meets $0 \le t \le d_1-1$ or $d_1+M_1+M_3+M_2 \le t \le d_1+M-1$ or $d_1+M_1+M_3+M_2+M \le t \le 2 \times M-1$;

at least one element in the first element group is a non-zero element, or at least one element in the signal sequence {Y(t)} is a non-zero element, and wherein at least one element in the signal sequence {Y(t)} is a non-zero element, the element Y(t) in the signal sequence {Y(t)} meets Y(t)=a×Y((t+M)mod(2M)); and the seventh element group carries $2 \times (M-M_1-M_2-M_3)$ information elements or at least one element in the seventh element group does not meet S(t mod (2M))=a×S((t+M)mod(2M)); and performing a discrete Fourier transform (DFT) on the signal sequence {B(t)}, and mapping the signal sequence obtained after DFT to a frequency domain subcarrier to generate a first signal mapped to the frequency domain subcarrier; or performing pulse shaping filtering on the signal sequence {B(t)} to generate a second signal on which pulse shaping filtering is performed.

2. The method according to claim 1, wherein:
the first element group carries $M_1+M_2$ information elements, wherein the $M_1+M_2$ information elements are at least one piece of: data, control information, and data and control information; and/or
the second element group carries $M_3$ information elements, wherein the $M_3$ information elements are at least one piece of: a reference signal, data, control information, and data and control information.

3. The method according to claim 1, wherein:
when t satisfies Y(t)=0: B(t)=S(t), $0 \le t \le 2 \times M-1$, and t is an integer.

4. The method according to claim 1, wherein:
when t satisfies Y(t)=0:
$0 \le t \le d_1+M_1-1$ or $d_1+M_1+M_3 \le t \le d_1+M-1$ or $d_1+M_1+M_3+M \le t \le 2 \times M-1$; and
wherein at least one Y(t) is not equal to 0, $d_1+M_1 \le t \le d_1+M_1+M_3-1$; and for t existing when Y(t) is not equal to 0, Y((t+M)mod(2M))=a×Y(t), and t satisfies:
S(t mod(2M))=$A_1$×c(t), and Y(t)=$A_2$×j×c(t) or Y(t)=−j×$A_2$×c(t), wherein c(t) is a non-zero complex number, $A_1$ is a non-zero real number, $A_2$ is a non-zero real number, and j represents an imaginary part of a complex number.

5. The method according to claim 1, wherein at least one of a value of $M_1$, a value of $M_2$, and a value of $M_3$ is a predefined value.

6. The method according to claim 1, wherein the method further comprises:
receiving signaling, and obtaining at least one of a value of $M_1$, a value of $M_2$, and a value of $M_3$ based on the signaling.

7. The method according to claim 1, wherein the method further comprises:
sending signaling, wherein the signaling indicates at least one of a value of $M_1$, a value of $M_2$, and a value of $M_3$.

8. The method according to claim 1, wherein $M_1>0$, and $M_2>0$.

9. A wireless communication apparatus, comprising:
a processor;
a memory; and
a computer-readable storage unit storing instructions, wherein the instructions when executed enable the processor to:
generate a signal sequence {B(t)} that comprises 2×M elements, wherein M and t are integers, and $0 \le t \le 2 \times M-1$, B(t) is an element in the signal sequence {B(t)}, B(t) meets B(t)=S(t)+Y(t), S(t) is an element in a signal sequence {S(t)}, and Y(t) is an element in a signal sequence {Y(t)}; wherein
the signal sequence {S(t)} comprises a first element group and a second element group, the first element group comprises $2 \times M_1+2 \times M_2$ elements, and the second element group comprises $2 \times M_3$ elements, wherein $M_1+M_2+M_3<M$, $M_1$ and $M_2$ are integers greater than or equal to 0, $M_3$ is an integer greater than 0, and $M_1+M_2$ is greater than or equal to 0;
the first element group comprises a third element group that has $M_1+M_2$ elements and a fourth element group that has $M_1+M_2$ elements, wherein an element in the third element group is S(t mod (2M)) that meets a following condition: t meets $d_1 \le t \le d_1+M_1-1$ or $d_1+M_1+M_3 \le t \le d_1+M_1+M_3+M_2-1$, wherein $d_1$ is an integer greater than or equal to 0, and mod represents a modulo operation; and an element in the fourth element group is S((t+M)mod(2M)) that meets a following set of conditions: t meets $d_1 \le t \le d_1+M_1-1$ or $d_1+M_1+M_3 \le t \le d_1+M_1+M_3+M_2-1$, and S(t mod (2M))=a×S((t+M)mod(2M)), wherein a=1 or −1;
at least one element in the second element group is a non-zero element, and the second element group comprises a fifth element group that has $M_3$ elements and a sixth element group that has $M_3$ elements, wherein an element in the fifth element group is S(t mod (2M)) that meets a following condition: t meets $d_1+M_1 \le t \le d_1+M_1+M_3-1$; and an element in the sixth element group is S((t+M)mod(2M)) that meets a following set of conditions: t meets $d_1+M_1 \le t \le d_1+M_1+M_3-1$, and S(t mod (2M))=−a×S((t+M)mod(2M));
the signal sequence {S(t)} further comprises a seventh element group, wherein at least one element in the seventh element group is a non-zero element, and an element in the seventh element group is S(t mod (2M)) that meets a following condition: t meets $0 \le t \le d_1-1$ or $d_1+M_1+M_3+M_2 \le t \le d_1+M-1$ or $d_1+M_1+M_3+M_2+M \le t \le 2 \times M-1$;

at least one element in the first element group is a non-zero element, or at least one element in the signal sequence $\{Y(t)\}$ is a non-zero element, and wherein at least one element in the signal sequence $\{Y(t)\}$ is a non-zero element, the element $Y(t)$ in the signal sequence $\{Y(t)\}$ meets $Y(t)=a \times Y((t+M) \mod (2M))$; and the seventh element group carries $2 \times (M-M_1-M_2-M_3)$ information elements or at least one element in the seventh element group does not meet $S(t \mod (2M))=a \times S((t+M) \mod (2M))$; and perform a discrete Fourier transform DFT on the signal sequence $\{B(t)\}$, and mapping the signal sequence obtained after DFT to a frequency domain subcarrier to generate a first signal mapped to the frequency domain subcarrier; or performing pulse shaping filtering on the signal sequence $\{B(t)\}$ to generate a second signal on which pulse shaping filtering is performed.

10. The communication apparatus of claim 9, wherein:

the first element group carries $M_1+M_2$ information elements, wherein the $M_1+M_2$ information elements are at least one piece of: data, control information, and data and control information; and/or the second element group carries $M_3$ information elements, wherein the $M_3$ information elements are at least one piece of: a reference signal, data, control information, and data and control information.

11. The communication apparatus according to claim 9, further comprising:

a transceiver configured to receive signaling, and the signaling indicates at least one of a value of $M_1$, a value of $M_2$, and a value of $M_3$, or the transceiver is configured to send signaling, and the signaling indicates at least one of a value of $M_1$, a value of $M_2$, and a value of $M_3$.

12. A wireless communication method, comprising:

obtaining a first signal $R(t)$, wherein t is an integer, and $0 \le t \le 2 \times M-1$;

the first signal is generated based on a signal sequence $\{B(t)\}$, wherein M and t are integers, and $0 \le t \le 2 \times M-1$, $B(t)$ is an element in $\{B(t)\}$ that comprises $2 \times M$ elements, $B(t)$ meets $B(t)=S(t)+Y(t)$, $S(t)$ is an element in a signal sequence $\{S(t)\}$, and $Y(t)$ is an element in a signal sequence $\{Y(t)\}$;

the signal sequence $\{S(t)\}$ comprises a first element group and a second element group, the first element group comprises $2 \times M_1+2 \times M_2$ elements, and the second element group comprises $2 \times M_3$ elements, wherein $M_1+M_2+M_3<M$, $M_1$ and $M_2$ are integers greater than or equal to 0, $M_3$ is an integer greater than 0, and $M_1+M_2$ is greater than or equal to 0;

the first element group comprises a third element group that has $M_1+M_2$ elements and a fourth element group that has $M_1+M_2$ elements, wherein an element in the third element group is $S(t \mod (2M))$ that satisfies: t meets $d_1 \le t \le d_1+M_1-1$ or $d_1+M_1+M_3 \le t \le d_1+M_1+M_3+M-1$, wherein $d_1$ is an integer greater than or equal to 0, and mod represents a modulo operation; and an element in the fourth element group is $S((t+M) \mod (2M))$ that satisfies: t meets $d_1 \le t \le d_1+M_1-1$ or $d_1+M_1+M_3 \le t \le d_1+M_1+M_3+M_2-1$, and $S(t \mod (2M))=a \times S((t+M) \mod (2M))$, wherein $a=1$ or $-1$;

at least one element in the second element group is a non-zero element, and the second element group comprises a fifth element group that has $M_3$ elements and a sixth element group that has $M_3$ elements, wherein an element in the fifth element group is $S(t \mod (2M))$ that satisfies: t meets $d_1+M_1 \le t \le d_1+M_1+M_3-1$; and an element in the sixth element group is $S((t+M) \mod (2M))$ that satisfies: t meets $d_1+M_1 \le t \le d_1+M_1+M_3-1$, and $S(t \mod (2M))=-a \times S((t+M) \mod (2M))$;

the signal sequence $\{S(t)\}$ further comprises a seventh element group, at least one element in the seventh element group is a non-zero element, and an element in the seventh element group is $S(t \mod (2M))$ that satisfies: t meets $0 \le t \le d_1-1$ or $d_1+M_1+M_3+M_2 \le t \le d_1+M-1$ or $d_1+M_1+M_3+M_2+M \le t \le 2 \times M-1$;

at least one element in the first element group is a non-zero element, or at least one element in $\{Y(t)\}$ is a non-zero element, and when at least one element in $\{Y(t)\}$ is a non-zero element, the element $Y(t)$ in $\{Y(t)\}$ meets $Y(t)=a \times Y((t+M) \mod (2M))$; and the seventh element group carries $2 \times (M-M_1-M_2-M_3)$ information elements or at least one element in the seventh element group does not meet $S(t \mod (2M))=a \times S((t+M) \mod (2M))$; and processing the first signal $R(t)$.

13. The method according to claim 12, wherein:

the first element group carries $M_1+M_2$ information elements, wherein the $M_1+M_2$ information elements are at least one piece of: data, control information, and data and control information; and/or the second element group carries $M_3$ information elements, wherein the $M_3$ information elements are at least one piece of: a reference signal, data, control information, and data and control information.

14. The method according to claim 12, wherein:

when t satisfies $Y(t)=0$: $B(t)=S(t)$, $0 \le t \le 2 \times M-1$, and t is an integer.

15. The method according to claim 12, wherein:

when t satisfies $Y(t)=0$:

$0 \le t \le d_1+M_1-1$ or $d_1+M_1+M_3 \le t \le d_1+M_1+M-1$ or $d_1+M_1+M_3+M \le t \le 2 \times M-1$; and wherein at least one Y(t) is not equal to 0, $d_1+M_1 \le t \le d_1+M_1+M_3-1$; and for t existing when Y(t) is not equal to 0, $Y((t+M) \mod (2M))=a \times Y(t)$, and t satisfies:

$S(t \mod (2M))=A_1 \times c(t)$, and $Y(t)=A_2 \times j \times c(t)$ or $Y(t)=-j \times A_2 \times c(t)$, wherein c(t) is a non-zero complex number, $A_1$ is a non-zero real number, $A_2$ is a non-zero real number, and j represents an imaginary part of a complex number.

16. The method according to claim 12, wherein at least one of a value of $M_1$, a value of $M_2$, and a value of $M_3$ is a predefined value.

17. The method according to claim 12, wherein the method further comprises:

receiving signaling, and obtaining at least one of a value of $M_1$, a value of $M_2$, and a value of $M_3$ based on the signaling.

18. The method according to claim 12, wherein the method further comprises:

sending signaling, wherein the signaling indicates at least one of a value of $M_1$, a value of $M_2$, and a value of $M_3$.

19. The method according to claim 12, wherein the processing the first signal R(t) comprises:

performing a fast Fourier transform (FFT) on the first signal R(t) to obtain a third signal $R_F(t)$, wherein t is an integer, and $0 \le t \le 2 \times M-1$;

obtaining a fourth signal $R_{F\_rs}(t)$ based on the third signal $R_F(t)$, wherein t is an integer, $0 \leq t \leq 2 \times M-1$, when t is an odd number, $R_{F\_rs}(t)=R_F(t)$, and when t is an even number, $R_{F\_rs}(t)=0$; or obtaining a fourth signal $R_{F\_rs}(t)$ based on the third signal $R_F(t)$, wherein t is an integer, $0 \leq t \leq 2 \times M-1$, when t is an even number, $R_{F\_rs}(t)=R_F(t)$, and when t is an odd number, $R_{F\_rs}(t)=0$;

performing an inverse discrete Fourier transform (IDFT) on the fourth signal $R_{F\_rs}(t)$ to obtain a fifth signal $R_T(t)$, wherein t is an integer, and $0 \leq t \leq 2 \times M-1$; and obtaining a sixth signal $R_{T\_rs}(t)$ based on the fifth signal $R_T(t)$, wherein t is an integer, and $0 \leq t \leq 2 \times M-1$; wherein when $d_1+M_1 \leq t \leq d_1+M_1+M_3+M_2-1$ or $d_1+M_1+M \leq t \leq d_1+M_1+M_3+M_2+M-1$, $R_{T\_rs}(t)=R_T(t)$; and when $0 \leq t \leq d_1+M_1-1$ or $d_1+M_1+M_3+M_2 \leq t \leq d_1+M_1+M-1$ or $d_1+M_1+M_3+M_2+M \leq t \leq 2 \times M-1$, $R_{T\_rs}(t)=0$.

20. The method according to claim 12, wherein the method comprises: receiving a second signal, and performing pulse shaping filtering on the second signal to obtain the first signal $R(t)$.

\* \* \* \* \*